United States Patent
Sullivan et al.

(10) Patent No.: US 11,724,890 B2
(45) Date of Patent: *Aug. 15, 2023

(54) PICKFACE BUILDER FOR STORAGE AND RETRIEVAL SYSTEMS

(71) Applicant: Symbotic LLC, Wilmington, MA (US)

(72) Inventors: Robert Sullivan, Wilmington, MA (US); Stephen C. Toebes, Chelmsford, MA (US)

(73) Assignee: Symbotic LLC, Wilmington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/657,007

(22) Filed: Mar. 29, 2022

(65) Prior Publication Data

US 2022/0219909 A1 Jul. 14, 2022

Related U.S. Application Data

(63) Continuation of application No. 17/136,475, filed on Dec. 29, 2020, now Pat. No. 11,286,118, which is a
(Continued)

(51) Int. Cl.
*B65G 47/08* (2006.01)
*B65G 1/04* (2006.01)
(Continued)

(52) U.S. Cl.
CPC ......... *B65G 47/086* (2013.01); *B65G 1/0485* (2013.01); *B65G 1/06* (2013.01);
(Continued)

(58) Field of Classification Search
CPC ...... B65G 47/086; B65G 1/0485; B65G 1/06; B65G 1/12; B65G 1/127; B65G 1/1371
See application file for complete search history.

(56) References Cited

U.S. PATENT DOCUMENTS 1,887,667 A 11/1932 Wheeler
2,877,575 A 3/1959 Stedt
(Continued)

FOREIGN PATENT DOCUMENTS

CN 1480388 3/2004
CN 1733579 2/2006
(Continued)

OTHER PUBLICATIONS

International Search Report, Chinese Patent Applicaton for Invention No. 201180067621.6, dated Oct. 28, 2014.
(Continued)

*Primary Examiner* — Gene O Crawford
*Assistant Examiner* — Lester Rushin, III
(74) *Attorney, Agent, or Firm* — Perman & Green, LLP

(57) ABSTRACT

A pickface builder for a storage and retrieval system for storing goods units and having an in-feed conveyor and a picking device, each goods unit holding at least one product package therein, the pickface builder including a frame, a pusher member movably coupled to the frame, and a snugger member movably coupled to the frame, wherein the pickface builder is configured to receive goods units from the in-feed conveyor and the pusher member and snugger member are movable at least in a direction transverse to a direction of goods unit travel on the in-feed conveyor and configured to form the goods units into a pickface picked by the picking device as a unit and having a predetermined reference datum relating the pickface to a placement position of goods units forming the pickface along a storage surface of the storage and retrieval system.

18 Claims, 28 Drawing Sheets

Related U.S. Application Data continuation of application No. 15/991,779, filed on May 29, 2018, now Pat. No. 10,875,722, which is a continuation of application No. 15/332,997, filed on Oct. 24, 2016, now Pat. No. 9,981,808, which is a continuation of application No. 13/326,869, filed on Dec. 15, 2011, now Pat. No. 9,475,649.

(60) Provisional application No. 61/423,242, filed on Dec. 15, 2010.

(51) Int. Cl.
    B65G 1/127    (2006.01)
    B65G 1/06     (2006.01)
    B65G 1/12     (2006.01)
    B65G 1/137    (2006.01)

(52) U.S. Cl.
    CPC .............. *B65G 1/12* (2013.01); *B65G 1/127* (2013.01); *B65G 1/1371* (2013.01)

(56) References Cited

U.S. PATENT DOCUMENTS

| | | |
|---|---|---|
| 2,945,604 A | 7/1960 | Kroll et al. |
| 3,016,154 A | 1/1962 | Ugolini et al. |
| 3,161,303 A | 12/1964 | Burrows |
| 3,554,390 A | 1/1971 | Saul |
| 3,581,915 A | 6/1971 | Saul |
| 3,738,506 A | 6/1973 | Cornford et al. |
| 3,845,715 A | 11/1974 | Hochstrasser |
| 3,876,095 A | 4/1975 | Stedt |
| 4,064,986 A | 12/1977 | Bertovich |
| 4,307,988 A | 12/1981 | Page et al. |
| 4,394,104 A | 7/1983 | Camerini et al. |
| 4,415,975 A | 11/1983 | Burt |
| 4,428,708 A | 1/1984 | Burt |
| 4,492,504 A | 1/1985 | Hainsworth |
| 4,678,390 A | 7/1987 | Bonneton et al. |
| 4,777,416 A | 10/1988 | George, II et al. |
| 4,883,401 A | 11/1989 | Kavieff |
| 4,909,697 A | 3/1990 | Bernard, II et al. |
| 4,967,370 A | 10/1990 | Stern et al. |
| 4,987,992 A | 1/1991 | Pfleger |
| 5,220,263 A | 6/1993 | Onishi et al. |
| 5,273,392 A | 12/1993 | Bernard, II et al. |
| 5,323,098 A | 6/1994 | Hamaguchi et al. |
| 5,337,880 A | 8/1994 | Claycomb et al. |
| 5,350,270 A | 9/1994 | Stallard et al. |
| 5,370,492 A | 12/1994 | Gleyze et al. |
| 5,395,206 A | 3/1995 | Cerny, Jr. |
| 5,509,538 A | 4/1996 | Spindler et al. |
| 5,548,516 A | 8/1996 | Gudat et al. |
| 5,559,696 A | 9/1996 | Borenstein |
| 5,611,422 A | 3/1997 | Harkonen |
| 5,615,992 A | 4/1997 | Proske et al. |
| 5,664,929 A | 9/1997 | Esaki et al. |
| 5,709,291 A | 1/1998 | Nishino et al. |
| 5,718,322 A | 2/1998 | Mulhern |
| 5,798,920 A | 8/1998 | Crucius et al. |
| 5,801,506 A | 9/1998 | Netzler |
| 5,810,540 A | 9/1998 | Castaldi |
| 5,974,348 A | 10/1999 | Rocks |
| 6,061,607 A | 5/2000 | Bradley et al. |
| 6,149,366 A | 11/2000 | Deandrea |
| 6,213,704 B1 | 4/2001 | White et al. |
| 6,257,826 B1 | 7/2001 | Neagle et al. |
| 6,289,260 B1 | 9/2001 | Bradley et al. |
| 6,295,922 B1 | 10/2001 | Salamone et al. |
| 6,377,867 B1 | 4/2002 | Bradley et al. |
| 6,394,260 B1 | 5/2002 | Barth et al. |
| 6,397,990 B1 | 6/2002 | Brien et al. |
| 6,463,360 B1 | 10/2002 | Terada et al. |
| 6,496,755 B2 | 12/2002 | Wallach et al. |
| 6,503,043 B1 | 1/2003 | Smith et al. |
| 6,597,143 B2 | 7/2003 | Song et al. |
| 6,663,334 B2 | 12/2003 | Warhurst et al. |
| 6,764,373 B1 | 7/2004 | Osawa et al. |
| 6,836,701 B2 | 12/2004 | McKee |
| 6,859,682 B2 | 2/2005 | Naka et al. |
| 6,922,632 B2 | 7/2005 | Foxlin |
| 7,039,501 B2 | 5/2006 | Freeman et al. |
| 7,054,716 B2 | 5/2006 | McKee et al. |
| 7,066,291 B2 | 6/2006 | Martins et al. |
| 7,069,124 B1 | 6/2006 | Whittaker et al. |
| 7,101,139 B1 | 9/2006 | Benedict |
| 7,133,746 B2 | 11/2006 | Abramson et al. |
| 7,137,593 B2 | 11/2006 | Baatz |
| 7,284,652 B2 | 10/2007 | Zeitler et al. |
| 7,329,081 B2 | 2/2008 | Baker et al. |
| 7,332,890 B2 | 2/2008 | Cohen et al. |
| 7,376,487 B2 | 5/2008 | Kumhyr |
| 7,397,213 B2 | 7/2008 | Im et al. |
| 7,421,268 B2 | 10/2008 | Steiner et al. |
| 7,456,596 B2 | 11/2008 | Goodall et al. |
| 7,460,462 B2 | 12/2008 | Mejia et al. |
| 7,499,155 B2 | 3/2009 | Cappelletti |
| 7,520,376 B2 | 4/2009 | Bar |
| 7,532,947 B2 | 5/2009 | Waddington et al. |
| 7,575,406 B2 | 8/2009 | Hofmeister et al. |
| 7,615,957 B2 | 11/2009 | Kim et al. |
| 7,653,457 B2 | 1/2010 | Bloom |
| 7,686,560 B2 | 3/2010 | Laurin et al. |
| 7,693,757 B2 | 4/2010 | Zimmerman |
| 7,695,235 B1 | 4/2010 | Rallis |
| 7,706,917 B1 | 4/2010 | Chiappetta et al. |
| 7,725,253 B2 | 5/2010 | Foxlin |
| 7,729,801 B2 | 6/2010 | Abramson |
| 7,771,152 B2 | 8/2010 | Waltersbacher |
| 7,783,383 B2 | 8/2010 | Eliuk et al. |
| 7,826,919 B2 | 11/2010 | D Andrea et al. |
| 7,826,920 B2 | 11/2010 | Stevens et al. |
| 7,845,486 B2 | 12/2010 | Spencer et al. |
| 7,856,290 B2 | 12/2010 | Kumhyr |
| 7,861,844 B2 | 1/2011 | Hayduchok et al. |
| 7,873,469 B2 | 1/2011 | D Andrea et al. |
| 7,894,940 B2 | 2/2011 | Kumhyr |
| 7,931,431 B2 | 4/2011 | Benedict et al. |
| 7,941,244 B2 | 5/2011 | Somin et al. |
| 7,944,368 B2 | 5/2011 | Carter et al. |
| 7,959,395 B2 | 6/2011 | Hofmeister et al. |
| 7,963,384 B2 | 6/2011 | Lafontaine |
| 7,972,102 B2 | 7/2011 | Ward et al. |
| 7,988,398 B2 | 8/2011 | Hofmeister et al. |
| 7,991,505 B2 | 8/2011 | Lert, Jr. et al. |
| 8,006,824 B2 | 8/2011 | Wada et al. |
| 8,024,064 B1 | 9/2011 | Sanghavi et al. |
| 8,028,822 B2 | 10/2011 | Braunstein |
| 8,046,103 B2 | 10/2011 | Abramson et al. |
| 8,046,160 B2 | 10/2011 | Carter et al. |
| 8,047,756 B2 | 11/2011 | Tuffs et al. |
| 8,425,173 B2 | 4/2013 | Lert et al. |
| 8,467,898 B2 | 6/2013 | Cardoni |
| 8,695,619 B2 | 4/2014 | Kissinger |
| 8,696,010 B2 | 4/2014 | Toebes et al. |
| 8,965,619 B2 | 2/2015 | Sullivan et al. |
| 9,187,244 B2 | 11/2015 | Toebes et al. |
| 9,475,649 B2 | 10/2016 | Toebes et al. |
| 2002/0037208 A1 | 3/2002 | Patrito |
| 2002/0124389 A1 | 9/2002 | Matson |
| 2004/0088081 A1 | 5/2004 | Song et al. |
| 2004/0238326 A1 | 12/2004 | Lichti |
| 2005/0238455 A1 | 10/2005 | Toteff |
| 2005/0238465 A1 | 10/2005 | Razumov |
| 2006/0072988 A1 | 4/2006 | Hariki et al. |
| 2007/0061041 A1 | 3/2007 | Zweig |
| 2007/0065258 A1 | 3/2007 | Benedict et al. |
| 2007/0065259 A1 | 3/2007 | Talley |
| 2007/0071585 A1 | 3/2007 | Henkel |
| 2007/0114975 A1 | 5/2007 | Cohen et al. |
| 2007/0125727 A1 | 6/2007 | Winkler |
| 2007/0267998 A1 | 11/2007 | Cohen et al. |
| 2008/0007203 A1 | 1/2008 | Cohen et al. |
| 2008/0024274 A1 | 1/2008 | Ishida et al. |

(56) References Cited

U.S. PATENT DOCUMENTS

| | | |
|---|---|---|
| 2008/0025833 A1 | 1/2008 | Baker et al. |
| 2008/0044262 A1 | 2/2008 | Kim et al. |
| 2008/0075357 A1 | 3/2008 | Yoon et al. |
| 2008/0080963 A1 | 4/2008 | Bufano et al. |
| 2008/0129445 A1 | 6/2008 | Kraimer et al. |
| 2008/0174268 A1 | 7/2008 | Koo et al. |
| 2008/0281717 A1 | 11/2008 | Kortelainen |
| 2009/0010749 A1* | 1/2009 | Germain ............... B65G 57/24 414/801 |
| 2009/0033316 A1 | 2/2009 | Hosek et al. |
| 2009/0074545 A1 | 3/2009 | Lert, Jr. et al. |
| 2009/0085741 A1 | 4/2009 | Ravi et al. |
| 2009/0148259 A1 | 6/2009 | Shani |
| 2009/0224750 A1 | 9/2009 | Hosek et al. |
| 2009/0265031 A1 | 10/2009 | Tachibana et al. |
| 2009/0266676 A1* | 10/2009 | Eschlbeck ............ B65G 47/086 198/348 |
| 2009/0284245 A1 | 11/2009 | Kirby et al. |
| 2009/0315501 A1 | 12/2009 | Li et al. |
| 2010/0083622 A1* | 4/2010 | Huber ................. B65G 47/086 53/244 |
| 2010/0114363 A1 | 5/2010 | Cardoni |
| 2010/0118149 A1 | 5/2010 | Levin et al. |
| 2010/0121481 A1 | 5/2010 | Talley et al. |
| 2010/0183409 A1 | 7/2010 | Checketts et al. |
| 2010/0185353 A1 | 7/2010 | Barwick et al. |
| 2010/0188210 A1 | 7/2010 | Howard et al. |
| 2010/0277005 A1 | 11/2010 | Karalis et al. |
| 2010/0277121 A1 | 11/2010 | Hall et al. |
| 2010/0290878 A1 | 11/2010 | Ricketts |
| 2010/0295943 A1 | 11/2010 | Cha et al. |
| 2010/0305854 A1 | 12/2010 | Kammel et al. |
| 2010/0308939 A1 | 12/2010 | Kurs |
| 2010/0316468 A1 | 12/2010 | Lert et al. |
| 2010/0322746 A1 | 12/2010 | Lert et al. |
| 2011/0038692 A1 | 2/2011 | Hofmeister et al. |
| 2011/0043373 A1 | 2/2011 | Best et al. |
| 2011/0058926 A1 | 3/2011 | Winkler |
| 2011/0068943 A1 | 3/2011 | Lane, Jr. |
| 2011/0082583 A1 | 4/2011 | Kumhyr |
| 2011/0102144 A1 | 5/2011 | Okina et al. |
| 2011/0106295 A1 | 5/2011 | Miranda et al. |
| 2011/0118903 A1 | 5/2011 | Kraimer et al. |
| 2011/0125323 A1 | 5/2011 | Gutmann et al. |
| 2011/0148364 A1 | 6/2011 | Ota |
| 2011/0182703 A1 | 7/2011 | Alan |
| 2011/0202175 A1 | 8/2011 | Romanov et al. |
| 2011/0208350 A1 | 8/2011 | Eliuk et al. |
| 2011/0216185 A1 | 9/2011 | Laws et al. |
| 2011/0238206 A1 | 9/2011 | Somin et al. |
| 2011/0254503 A1 | 10/2011 | Widmer et al. |
| 2011/0285349 A1 | 11/2011 | Widmer et al. |
| 2011/0297509 A1 | 12/2011 | Taylor |
| 2012/0179337 A1 | 7/2012 | Doan |
| 2012/0185082 A1 | 7/2012 | Toebes et al. |
| 2012/0189409 A1 | 7/2012 | Toebes et al. |
| 2012/0189416 A1 | 7/2012 | Toebes et al. |
| 2012/0195720 A1 | 8/2012 | Sullivan et al. |
| 2015/0336741 A1 | 11/2015 | Ahammer et al. |

FOREIGN PATENT DOCUMENTS

| | | |
|---|---|---|
| CN | 101068729 | 11/2007 |
| DE | 2150500 | 4/1973 |
| DE | 10356563 | 6/2005 |
| DE | 102009017556 | 10/2010 |
| EP | 0285527 | 10/1988 |
| EP | 0698530 | 2/1996 |
| EP | 0995704 | 4/2000 |
| EP | 1193195 | 4/2002 |
| EP | 1818286 | 8/2007 |
| JP | 4416419 | 7/1969 |
| JP | 60183405 | 9/1985 |
| JP | 61094905 | 5/1986 |
| JP | 62166701 | 7/1987 |
| JP | 62166710 | 7/1987 |
| JP | 311335 | 5/1991 |
| JP | 03111335 | 5/1991 |
| JP | 1991111335 | 5/1991 |
| JP | 03253203 | 11/1991 |
| JP | 465211 | 6/1992 |
| JP | 07187329 | 7/1995 |
| JP | 08009055 | 1/1996 |
| JP | 08251716 | 9/1996 |
| JP | 2001084037 | 3/2001 |
| JP | 2003012119 | 1/2003 |
| JP | 2004273283 | 9/2004 |
| JP | 2005138956 | 6/2005 |
| JP | 2005154067 | 6/2005 |
| JP | 2005154097 | 6/2005 |
| JP | 2008100777 | 1/2008 |
| JP | 2010520076 | 6/2010 |
| JP | 20120211019 | 12/2011 |
| JP | 2012184085 | 9/2012 |
| KR | 20120013979 | 2/2012 |
| TW | 393437 | 6/2000 |
| TW | 588712 | 5/2004 |
| WO | 2005119332 | 5/2005 |
| WO | 2005071597 | 8/2005 |
| WO | 2008107769 | 9/2008 |
| WO | 2010118412 | 10/2010 |
| WO | 2012044734 | 4/2012 |

OTHER PUBLICATIONS

International Search Report, International Patent Application No. PCT/US2011/065248, dated Mar. 20, 2012.

International Search Report, International Application No. PCT/US2014/030217, dated Jul. 7, 2014.

* cited by examiner

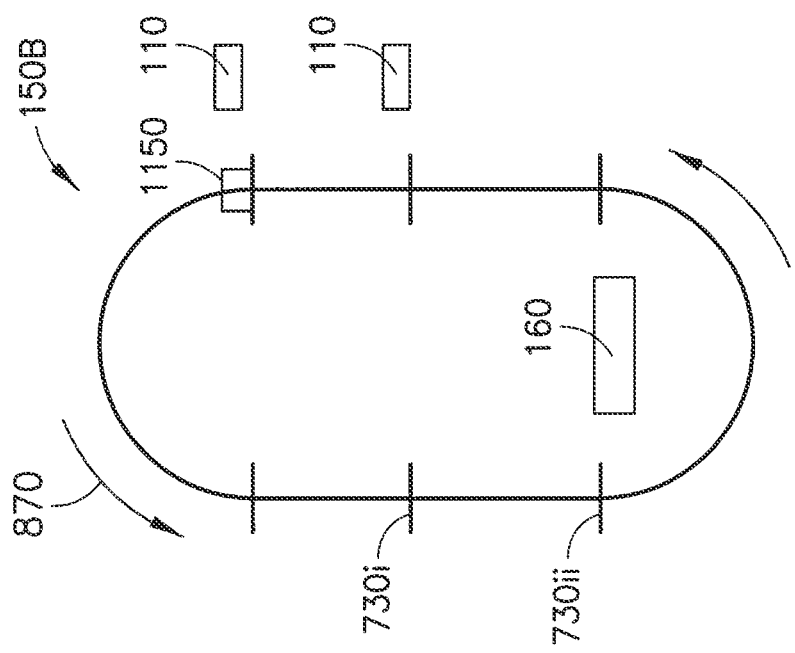
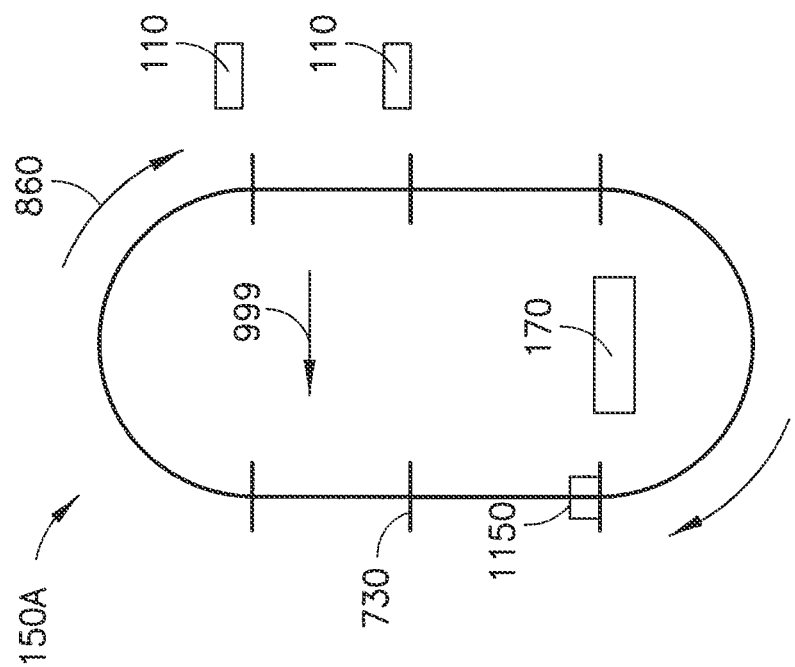

PICKFACE BUILDER FOR STORAGE AND RETRIEVAL SYSTEMS

CROSS-REFERENCE TO RELATED APPLICATIONS

This application is a continuation of U.S. Non-Provisional patent application Ser. No. 17/136,475, filed Dec. 29, 2020, (Now U.S. Pat. No. 11,286,118, issued Mar. 29, 2022), which is a continuation of U.S. Non-Provisional patent application Ser. No. 15/991,779, filed May 29, 2018, (Now U.S. Pat. No. 10,875,722, issued Dec. 29, 2020), which is a continuation of U.S. Non-Provisional patent application Ser. No. 15/332,997, filed on Oct. 24, 2016, (Now U.S. Pat. No. 9,981,808, issued May 29, 2018), which is a continuation of U.S. Non-Provisional patent application Ser. No. 13/326,869, filed on Dec. 15, 2011, (Now U.S. Pat. No. 9,475,649, issued Oct. 25, 2016), which claims priority from and the benefit of U.S. Provisional Patent Application No. 61/423,242, filed on Dec. 15, 2010, the disclosures of which are incorporated herein by reference in their entireties.

BACKGROUND

1. Field

The embodiments generally relate to material handling systems and, more particularly, to automated storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally, where the case units are stored in multilevel racks, case units are placed on the different levels of the racks with a lifting device on the transport device. Where the case units are stored in racks located on different floors or levels of the storage structure the case units are generally transported between the floors while disposed on the transport devices where the transport devices travel up and down ramps spanning between the floors. In other examples the transport device with the case units disposed thereon are raised and lowered between the floors with an elevator. Generally, the case units carried by the transport devices and stored on the storage racks are contained in carriers, for example storage containers such as trays, totes or shipping cases, or on pallets. Generally, incoming pallets to the warehouse (such as from manufacturers) contain shipping containers (e.g. cases) of the same type of goods. Outgoing pallets leaving the warehouse, for example, to retailers have increasingly been made of what may be referred to as mixed pallets. As may be realized, such mixed pallets are made of shipping containers (e.g. totes or cases such as cartons, etc.) containing different types of goods. For example, one case on the mixed pallet may hold grocery products (soup can, soda cans, etc.) and another case on the same pallet may hold cosmetic or household cleaning or electronic products. Indeed some cases may hold different types of products within a single case. Conventional warehousing systems, including conventional automated warehousing systems do not lend themselves to efficient generation of mixed goods pallets. In addition, storing case units in, for example carriers, totes, trays or on pallets generally does not allow for the retrieval of individual case units within those carriers or pallets without transporting the carriers or pallets to a workstation for manual or automated removal of the individual case units.

It would be advantageous to be able to transport uncontained or unpalletized case units between levels of a storage facility independent of transport device movement between the levels.

BRIEF DESCRIPTION OF THE DRAWINGS

The foregoing aspects and other features of the disclosed embodiments are explained in the following description, taken in connection with the accompanying drawings, wherein:

FIGS. 2A, 2B, 2C, 2D, 3A and 3B illustrate schematic views of a conveyor system in accordance with the embodiments;

DETAILED DESCRIPTION OF THE EXEMPLARY EMBODIMENT(S)

Figure 1:
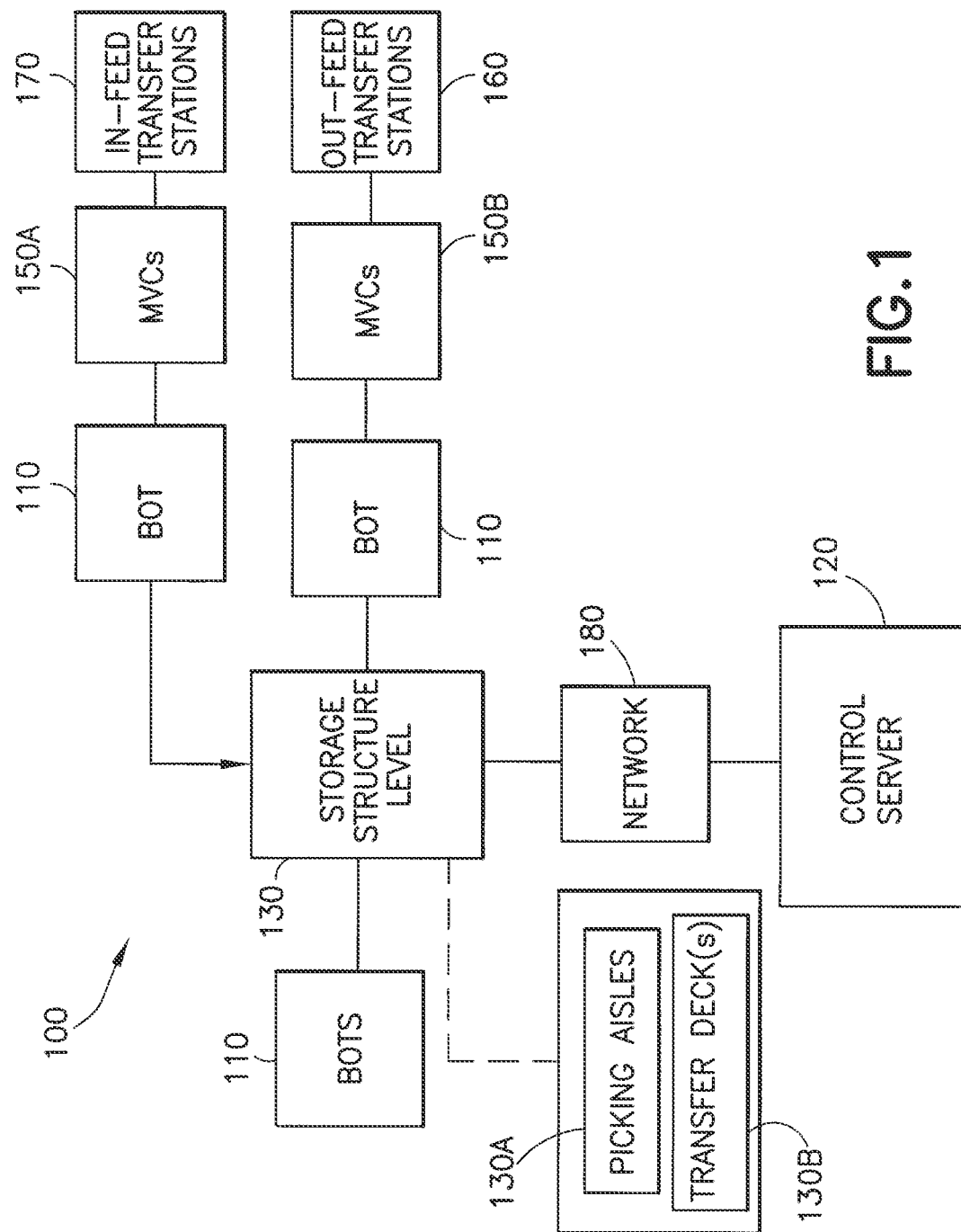
FIG. 1 schematically illustrates an exemplary storage and retrieval system in accordance with the embodiments.

FIG. 1 generally schematically illustrates a storage and retrieval system 100 in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g.

case of soup cans, boxes of cereal, etc.) or individual items that are adapted to be taken off of or placed on a pallet. In accordance with the embodiments, shipping cases or case units (e.g. cartons, barrels, boxes, crates, jugs, or any other suitable device for holding items) may have variable sizes and may be used to hold items in shipping and may be configured so they are capable of being palletized for shipping. It is noted that when, for example, pallets of items arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In the embodiments the storage and retrieval system described herein may be applied to any environment in which items (e.g. goods units holding at least one product package therein) are stored and retrieved.

The storage and retrieval system 100 may be configured for installation in, for example, existing warehouse structures or adapted to new warehouse structures. In the embodiments, the storage and retrieval system 100 may be substantially similar to that described in, for example, U.S. Provisional Patent Application No. 61/423,340, filed on Dec. 15, 2010, U.S. patent application Ser. No. 13/326,674, filed on Dec. 15, 2011, and U.S. patent application Ser. No. 12/757,381, filed on Apr. 9, 2010 (now U.S. Pat. No. 8,740,538, issued Jun. 3, 2014), the disclosures of which are incorporated herein by reference in their entireties. In one example, the storage and retrieval system 100 may include in-feed and out-feed transfer devices, such as stations 170, 160, multilevel vertical conveyors or picking devices 150A, 150B (MVCs), a storage structure 130, and a number of autonomous vehicular transport robots 110 (referred to herein as "bots") that may also operate as transfer devices. In the embodiments the storage and retrieval system may also include transfer devices including robot or bot transfer stations 140 (FIGS. 6A-6D) that may provide an interface between the bots 110 and the multilevel vertical conveyors 150A, 150B. In the embodiments, any suitable transfer device may be provided at any location and on either side or level of MVC 150A, 150B to remove or pick material from or replace or place material to MVC 150A, 150B at any shelf or platform level or location or otherwise. The in-feed transfer stations 170 and out-feed transfer stations 160 may operate together with their respective multilevel vertical conveyors 150A, 150B for transferring items to and from one or more levels of a multi-level storage structure 130. It is noted that while the multilevel vertical conveyors are described herein as being dedicated inbound conveyors 150A and outbound conveyors 150B, in the embodiments each of the conveyors 150A, 150B may be used for both inbound and outbound transfer of case units/items from the storage and retrieval system. It is noted that while multilevel vertical conveyors are described herein in other aspects the conveyors may be any suitable conveyors or transfer/picking devices having any suitable transport path orientation. Bots 110 may be disposed on each level of the multi-level storage structure 130 so that the bots 110 on a respective level can traverse an entirety of that level. The bots 110 may be configured to place items, such as the above described retail merchandise, into picking stock as described in U.S. patent application Ser. No. 12/757,312, filed on Apr. 9, 2010 (now U.S. Pat. No. 8,425,173, issued Apr. 23, 2013), the disclosure of which is herein incorporated by reference in its entirety. Other suitable examples of bots are described in, for example, U.S. Provisional Patent Application No. 61/423,220, filed on Dec. 15, 2010, U.S. patent application Ser. No. 13/327,040, filed on Dec. 15, 2011 (now U.S. Pat. No. 9,187,244, issued Nov. 17, 2015), U.S. patent application Ser. No. 14/942,717, filed on Nov. 16, 2015 (now U.S. Pat. No. 9,676,551, issued Jun. 13, 2017, U.S. Provisional Patent Application No. 61/423,365, filed on Dec. 15, 2010, U.S. patent application Ser. No. 13/326,952, filed on Dec. 15, 2011, U.S. Provisional Patent Application No. 61/423,359, filed on Dec. 15, 2010, U.S. patent application Ser. No. 13/326,447, filed on Dec. 15, 2011 (now U.S. Pat. No. 8,965,619, issued Feb. 24, 2015), U.S. Provisional Patent Application No. 61/423,388, filed on Dec. 15, 2010, and U.S. patent application Ser. No. 13/326,993, filed on Dec. 15, 2011 (now U.S. Pat. No. 9,499,338, issued Nov. 22, 2016), the disclosures of which are incorporated herein by reference in their entireties. In the embodiments, the bots 110 may be configured to interface directly with the shelves of the multilevel vertical conveyors 150A, 150B. In the embodiments the bots 110 may interface indirectly with the multilevel vertical conveyors 150A, 150B through, for example, bot transfer stations 140 disposed on a respective level of the multi-level storage structure 130.

As described above, the storage structure 130 may include multiple levels of storage rack modules where, in the embodiments, each level includes respective picking aisles 130A and at least one transfer deck 130B for allowing the bots 110 to traverse respective levels of the storage structure 130 for transferring case units between any of the storage areas of the storage structure 130 and any shelf of any multilevel vertical conveyor 150A, 150B. The picking aisles 130A, and transfer decks 130B also allow the bots 110 to place case units into picking stock and to retrieve ordered case units. In the embodiments each level may include bot transfer stations 140 for allowing the exchange of items between the multilevel vertical conveyors 150A, 150B and a bot on a respective storage level of the storage structure 130. The storage structure 130 may be substantially similar to the storage structure described in U.S. Provisional Patent Application No. 61/423,340, filed on Dec. 15, 2010, U.S. patent application Ser. No. 13/326,674, filed on Dec. 15, 2011, U.S. patent application Ser. No. 12/757,381, filed on Apr. 9, 2010 (now U.S. Pat. No. 8,740,538, issued Jun. 3, 2014), U.S. patent application Ser. No. 14/089,434, filed on Nov. 25, 2013 (now U.S. Pat. No. 9,051,120, issued Jun. 9, 2015), and U.S. patent application Ser. No. 14/733,341, filed on Jun. 8, 2015 (now U.S. Pat. No. 9,771,217, issued Sep. 26, 2017), the disclosures of which are incorporated herein by reference in their entireties.

One or more central system control computers (e.g. control server) 120 may coordinate or otherwise control the operation of the multilevel vertical conveyors 150A, 150B with other suitable features of the storage and retrieval system 100 in a manner substantially similar to that described in U.S. patent application Ser. No. 14/757,337, filed on Apr. 9, 2010 (now U.S. Pat. No. 8,594,835, issued Nov. 26, 2013), and U.S. patent application Ser. No. 12/757,220, filed on Apr. 9, 2010 (now U.S. Pat. No. 9,096,375, issued Aug. 4, 2015), the disclosures of which are incorporated herein by reference in their entireties. For example, the control server 120 may control the operation of the storage and retrieval system 100 through, for example, any suitable communications network 180.

The storage structure 130 of the embodiments may be arranged such that if desired there is substantially no vertical or horizontal array partitioning of the storage structure. For example, each multilevel vertical conveyor 150A, 150B may be common to all or substantially all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). Conversely case units from any shelf of each multilevel vertical conveyor 150A, 150B can be transferred to any or each storage space throughout the storage structure or to each storage space of any level of the storage structure. The multilevel vertical conveyors 150A, 150B can also receive case units from any storage space on any level of the storage structure 130 (e.g. no horizontal partitioning). Suitable examples of multilevel vertical conveyors can be found in, for non-limiting exemplary purposes, U.S. patent application Ser. No. 12/757,354, filed on Apr. 9, 2010 (now U.S. Pat. No. 9,694,975, issued Jul. 4, 2017), and U.S. patent application Ser. No. 12/757,220, filed on Apr. 9, 2010 (now U.S. Pat. No. 9,096,375, issued Aug. 4, 2015), the disclosures of which are incorporated herein by reference in their entireties.

Figure 2A:
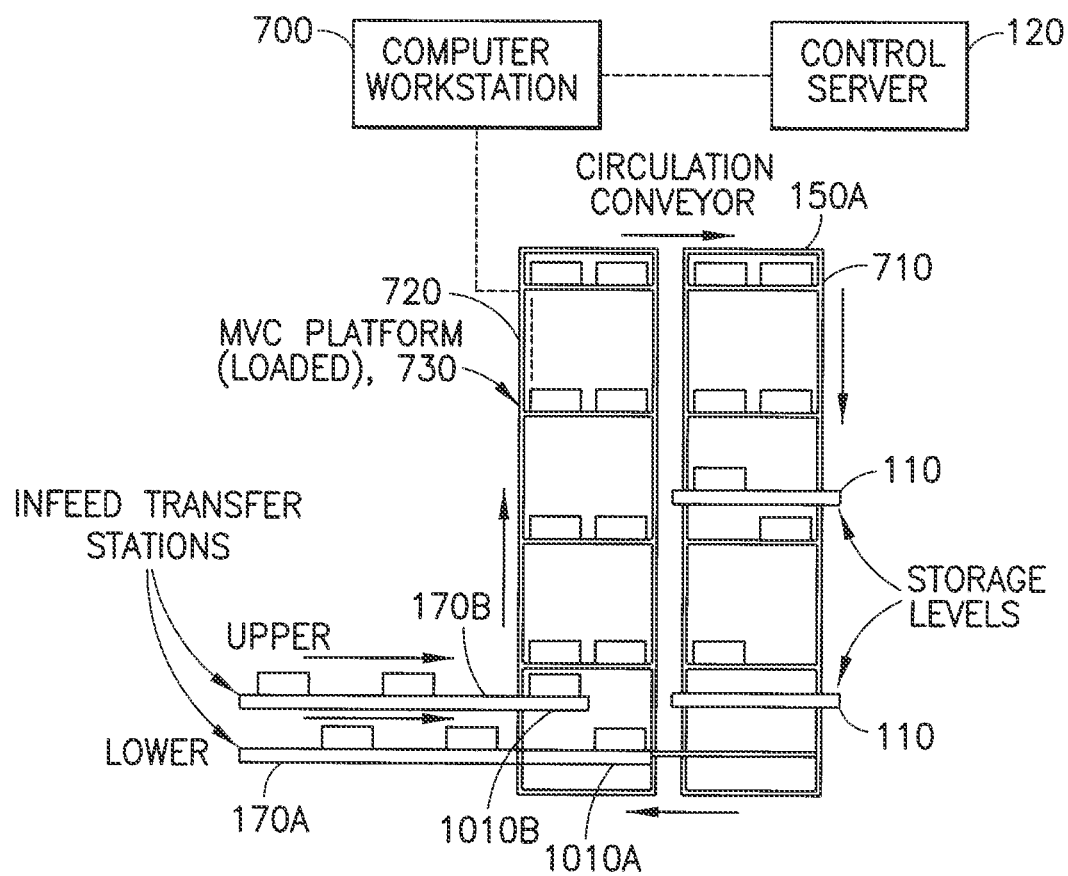

Referring now to FIG. 2A, the multilevel vertical conveyors will be described in greater detail. It is noted that the input multilevel vertical conveyor 150A and associated in-feed transfer stations 170 are described, however, the out-feed multilevel vertical conveyors 150B, bot transfer stations 140B and out-feed transfer stations 160 may be substantially similar to that described below for their in-feed counterparts but for the direction of material flow out of the storage and retrieval system 100 rather than into the storage and retrieval system 100. As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units (alone or in combinations) between the storage spaces and the multilevel vertical conveyors with one pick (e.g. substantially directly between the storage spaces and the multilevel vertical conveyors). The case unit(s) (which may be uncontained) being so transferred at one time (e.g. as a unit) may be referred to generally as a pickface. By way of further example, the designated bot 110 picks the case unit(s) or pickface from a shelf of a multilevel vertical conveyor, transports the case unit(s) to a predetermined storage area of the storage structure 130 and places the case unit(s) or pickface in the predetermined storage area (and vice versa).

Generally, the multilevel vertical conveyors include payload shelves 730 (FIGS. 2A-4) attached to chains or belts that form continuously moving or circulating vertical loops (the shape of the loop shown in the FIGS. is merely exemplary and in the embodiments the loop may have any suitable shape including rectangular and serpentine) that move at a substantially constant rate, so that the shelves 730 use what may be referred to as the "paternoster" principle of continuous conveyance, with loading and unloading performed at any point in the loop without slowing or stopping. In the embodiments, it should be understood that the payload shelves 730 can be driven by any suitable drive mechanism such as tracks, gears, etc. The multilevel vertical conveyors 150A, 150B may be controlled by a server, such as for example, control server 120, or any other suitable controller. One or more suitable computer workstations 700 may be connected to the multilevel vertical conveyors 150A, 150B and the server 120 in any suitable manner (e.g. wired or wireless connection) for providing, as an example, inventory management, multilevel vertical conveyor functionality and control, and customer order fulfillment. As may be realized, the computer workstations 700 and/or server 120 may be programmed to control the in-feed and/or out-feed conveyor systems. In the embodiments, the computer workstations 700 and/or server 120 may also be programmed to control the transfer stations 140. In the embodiments, one or more of the workstations 700 and control server 120 may include a control cabinet, a programmable logic controller and variable frequency drives for driving the multilevel vertical conveyors 150A, 150B. In the embodiments the workstations 700 and/or control server 120 may have any suitable components and configuration. In the embodiments, the workstations 700 may be configured to substantially remedy any exceptions or faults in the in-feed and/or out-feed conveyor systems substantially without operator assistance and communicate fault recovery scenarios with the control server 120 and/or vice versa.

Figure 4:
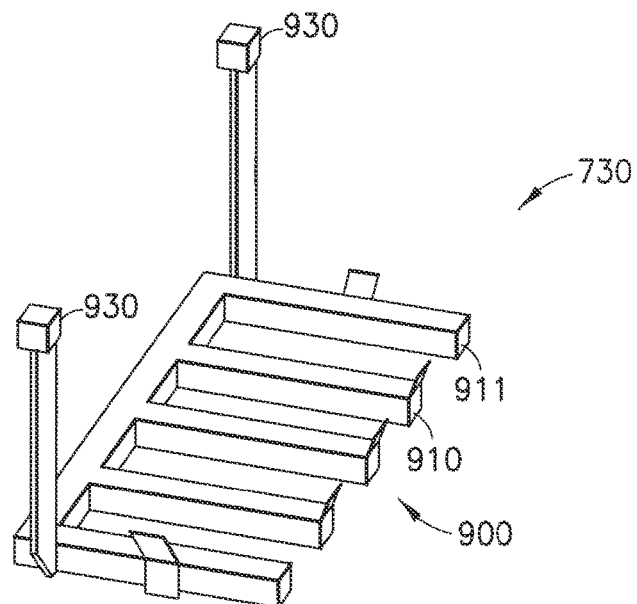
FIG. 4 illustrates a schematic view of a conveyor shelf in accordance with the embodiments.
Figure 5:
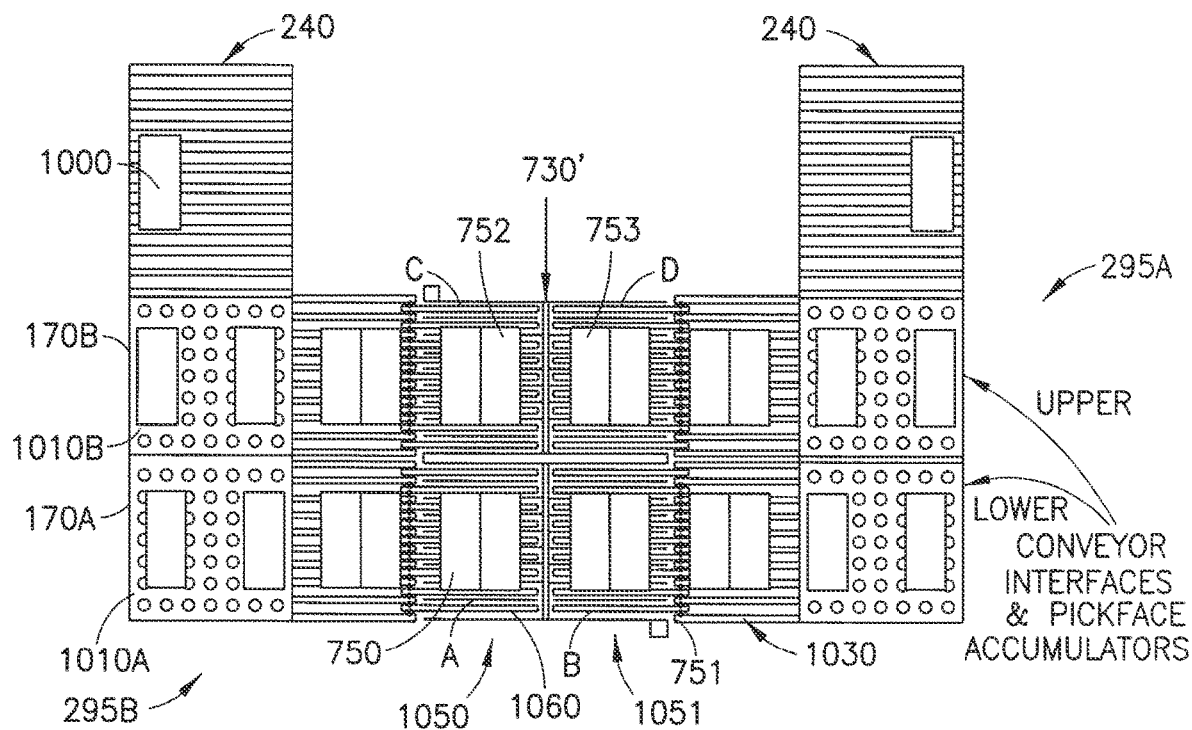
FIG. 5 schematically illustrates a conveyor system in accordance with the embodiments.

Referring still to FIG. 2A and also to FIG. 4, in the embodiments, the multilevel vertical conveyors 150A may include a frame 710 configured to support driven members such as, for example, chains 720. The chains 720 may be coupled to the shelves 730, which are movably mounted to the frame 710 such that the chains 720 effect substantially continuous movement of the shelves 730 around the frame 710. In the embodiments, any suitable drive link, such as for example, belts or cables may be used to drive the shelves 730. Each shelf 730 may include, for example, supports 930 and a platform 900. The supports 930 may extend from the platform 900 and be configured for attaching and mounting the shelf 730 to, for example, one or more drive chains 720. The platform 900 may include, for example, any suitably shaped frame 911, which in this example is generally "U" shaped (e.g. having lateral members connected by a span member at one end), and any suitable number of spaced apart fingers 910 extending from the frame 911. The fingers 910 may be configured for supporting the pickfaces 750, 752 (FIG. 2B) where each pickface comprises at least one uncontained case unit. In the embodiments, each of the fingers 910 may be removably fastened to a frame 911 for facilitating replacement or repair of individual fingers 910. The fingers 910, frame 911 (and supports 930) may form an integral structure or platform that defines the seating surface that contacts and supports the uncontained case units. It is noted that the shelf 730 illustrates only a representative structure and in the embodiments, the shelves 730 may have any suitable configuration and size for transporting pickfaces 750, 752 as will be described further below. As maybe realized the fingers 910 of each of the one or more pickface support stations A-D, define the seating surface against which the one or more uncontained cases of each pickface are gated. As seen in FIG. 5, the pickfaces on the support station may have constraints to prevent movement of the pickface(s) relative to the support stations (A-D). The spaced apart fingers 910 are configured to interface with, for example, a transfer arm or effector of the bots 110 and the in-feed transfer stations 170 for transferring the loads 750, 752 between the multilevel vertical conveyor 150A and one or more of the transfer stations 170 and bots 110. In the embodiments, the spaced apart fingers 900 may be configured to interface with bot transfer stations 140 as described below.

The multilevel vertical conveyors 150A may also include a suitable stabilizing device(s), such as for example, driven stabilizing chains for stabilizing the shelves 730 during vertical travel. In one example, the stabilizing devices may include chain driven dogs that are engaged to the shelves in both the upward and downward directions to form, for example, a three point engagement with the shelf supports 930. The drive chains 720 for the shelves 730 and stabilizing devices may be drivingly coupled to for example, any suitable number of drive motors under the control of, for example, one or more of the computer workstations 700 and control server 120. Further examples for effecting stability of the conveyor shelves 730 in the embodiments are described later in the specification.

Figure 2B:
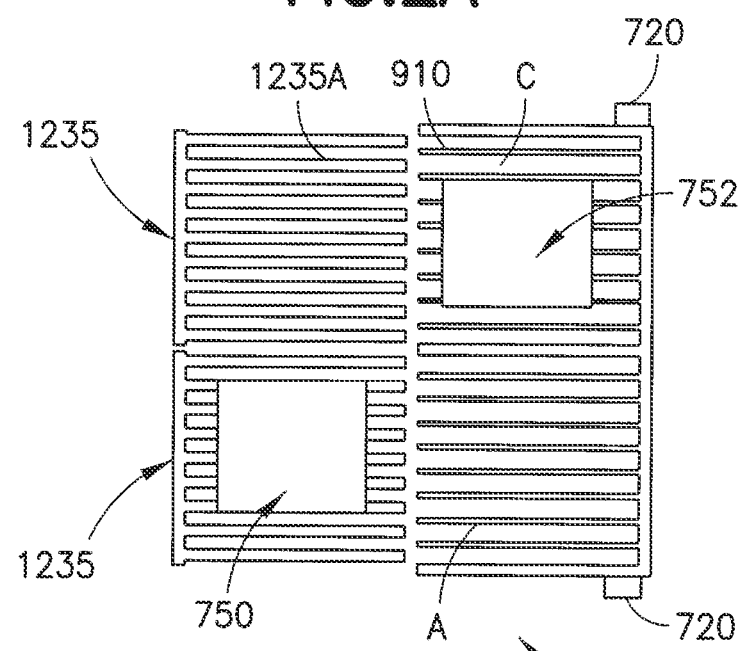

In the embodiments there may be any suitable number of shelves 730 mounted and attached to the drive chains 720. As can be seen in FIG. 2B each shelf 730 may be configured to carry, for exemplary purposes only, at least two separate pickfaces 750, 752 in corresponding positions A, C on the shelf 730 (e.g. a single vertical conveyor is functionally equivalent to multiple individually operated conveyors arranged adjacent one another). In the embodiments, as can be seen in FIG. 5 the shelves 730' may be configured to carry, for exemplary purposes only, four separate pickfaces 750-753 in corresponding positions A-D. In the embodiments, each shelf may be configured to carry more or less than four separate loads. As described above, each pickface may comprise one or more uncontained case units and may correspond to the load of a single bot 110. As may be realized, the space envelope or area platform of each pickface may be different. By way of example, uncontained cases, such as those directly transported by the multilevel vertical conveyors have various different sizes (e.g. differing dimensions). Also, as noted each pickface may include one or more uncontained cases. Thus, the length and width of each pickface carried by the multilevel vertical conveyors may be different. In the embodiments each pickface may be broken between, for example, bots 110 where different portions of the pickface are transported by more than one bot 110 on, for example, different levels of the storage structure 130. As may be realized when a pickface is broken each portion of the broken pickface may be considered as a new pickface by the storage and retrieval system 100. For exemplary purposes only, referring to FIGS. 3A, 3B the shelves 730 of the multilevel vertical conveyors 150A, 150B may be spaced from each other by a predetermined pitch P to allow for placement or removal of loads 810, 820 from the substantially continuously moving shelves 730 as will be described below.

Referring now to FIG. 5, and as described above, the multilevel vertical conveyors, such as conveyor 150A are supplied with case units 1000 from in-feed transfer stations 170 (FIG. 1). As described above, the in-feed transfer stations 170 may include one or more of depalletizing workstations, conveyors 240, conveyor interfaces/bot load accumulators 1010A, 1010B and conveyor mechanisms 1030. As can be seen in FIG. 5, case units 1000 are moved from, for example depalletizing workstations by conveyors 240. In this example, each of the positions A-D is supplied by a respective in-feed transfer station. As may be realized, while the transfer of case units is being described with respect to shelves 730' it should be understood that transfer of case units to shelves 730 occurs in substantially the same manner. For example, position A may be supplied by in-feed transfer station 170A and position C may be supplied by in-feed transfer station 170B. Referring also to FIG. 2A the in-feed transfer stations 170A, 170B, for supplying similar sides of the shelf 730 (in this example positions A and C, which are disposed side by side, form a first side 1050 of the shelf 730 and positions B and D, which are disposed side by side, form a second side 1051 of the shelf 730), may be located one above the other in a horizontally staggered stacked arrangement (an exemplary stacked arrangement is shown in FIG. 2A). In the embodiments, the stacked arrangement may be configured so that the in-feed transfer stations are disposed vertically in-line one above the other and extend into the multilevel vertical conveyors by different amounts for supplying, for example, positions A and B or positions C and D where positions A and B (and positions C and D) are disposed one in front of the other, rather than side by side. In the embodiments, the in-feed transfer stations may have any suitable configuration and positional arrangement. As can be seen in FIG. 5, the first side 1050 and second side 1051 of the shelf 730 are loaded (and unloaded) in opposing directions such that each multilevel vertical conveyor 150A is located between respective transfer areas 295A, 295B where the first side 1050 interfaces with a transfer area 295B and the second side 1051 interfaces with transfer area 295A.

In the embodiments, the accumulators 1010A, 1010B may be configured to form the case units 1000 into the individual pickfaces 750-753 prior to loading a respective position A-D on the multilevel vertical conveyor 730. In the embodiments, the computer workstation 700 and/or control server 120 may provide instructions or suitably control the accumulators 1010A, 1010B (and/or other components of the in-feed transfer stations 170) for accumulating a predetermined number of items to form the pickfaces 750-753. The accumulators 1010A, 1010B may align the case units in any suitable manner (e.g. making one or more sides of the items flush, etc.) and, for example, abut the items together. The accumulators 1010A, 1010B may be configured to transfer the pickfaces 750-753 to respective conveyor mechanisms 1030 for transferring the pickfaces 750-753 to a respective shelf position A-D. In the embodiments the conveyor mechanisms 1030 may include belts or other suitable feed devices for moving the pickfaces 750-753 onto transfer platforms 1060. The transfer platforms 1060 may include spaced apart fingers for supporting the pickfaces 750-753 where the fingers 910 of the shelves 730 are configured to pass between the fingers of the transfer platforms 1060 for lifting (or placing) the pickfaces 750-753 from the transfer platforms 1060. In the embodiments, the fingers of the transfer platforms 1060 may be movable and serve to insert the pickfaces 750-753 into the path of the shelves 730 in a manner similar to that described below with respect to the bot transfer stations 140. In the embodiments the in-feed transfer stations 170 (and out-feed transfer stations 160) may be configured in any suitable manner for transferring case units (e.g. the pickfaces formed by the case units) onto or from respective multilevel vertical conveyors 150A, 150B.

It is noted that while the interface between the bot transfer stations 140 and the multilevel vertical conveyors 150A, 150B are described it should be understood that interfacing between the bots 110 and the multilevel vertical conveyors 150A, 150B occurs in a substantially similar manner (e.g. as described in U.S. patent application Ser. No. 12/757,312, filed on Apr. 9, 2010 (now U.S. Pat. No. 8,425,173, issued Apr. 23, 2013), previously incorporated herein by reference in its entirety). For exemplary purposes only, referring now to FIGS. 2B and 6A-6D, the multilevel vertical conveyors 150A transfer pickfaces 750, 752 from, for example, the in-feed transfer stations 170 (or any other suitable device or loading system) to, for example, the bot transfer stations 140 associated with each of the levels in the storage structure 130. In other examples, the pickfaces 750, 752 may be transferred directly from the multilevel vertical conveyors 150A to the bots 110 as described below. As may be realized, the bot transfer stations 140 are disposed on respective levels of the storage structure adjacent the path of travel of the shelves 730 of a respective multilevel vertical conveyor 150A. In the embodiments, there may be a bot transfer station 140 corresponding to each of the positions A and C on the shelves 730 (and positions A-D with respect to shelf 730'). For example, a first bot transfer station 140 may remove load 750 from position A on shelf 730 while another bot transfer station 140 may remove pickface 752 from position C on shelf 730 and so on. In the embodiments, one bot transfer station 140 may serve to remove or place case units in more than one position A, C on the shelves 730. For example, one bot transfer station 140 may be configured for removing pickfaces 750, 752 from one or more of positions A, C of shelf 730. In the embodiments, referring also to FIG. 5, one bot transfer station 140 may be configured for removing pickfaces 750, 752 from one or more of positions A, C on a first side 1050 of the shelf 730' while another bot transfer station 140 may be configured to remove pickfaces 751, 753 from one or more positions B, D on a second side 1051 of the shelf 730'. In the embodiments the bot transfer stations 140 may have any suitable configuration for accessing any suitable number of positions A-D of the shelves 730, 730'.

Figure 6B:
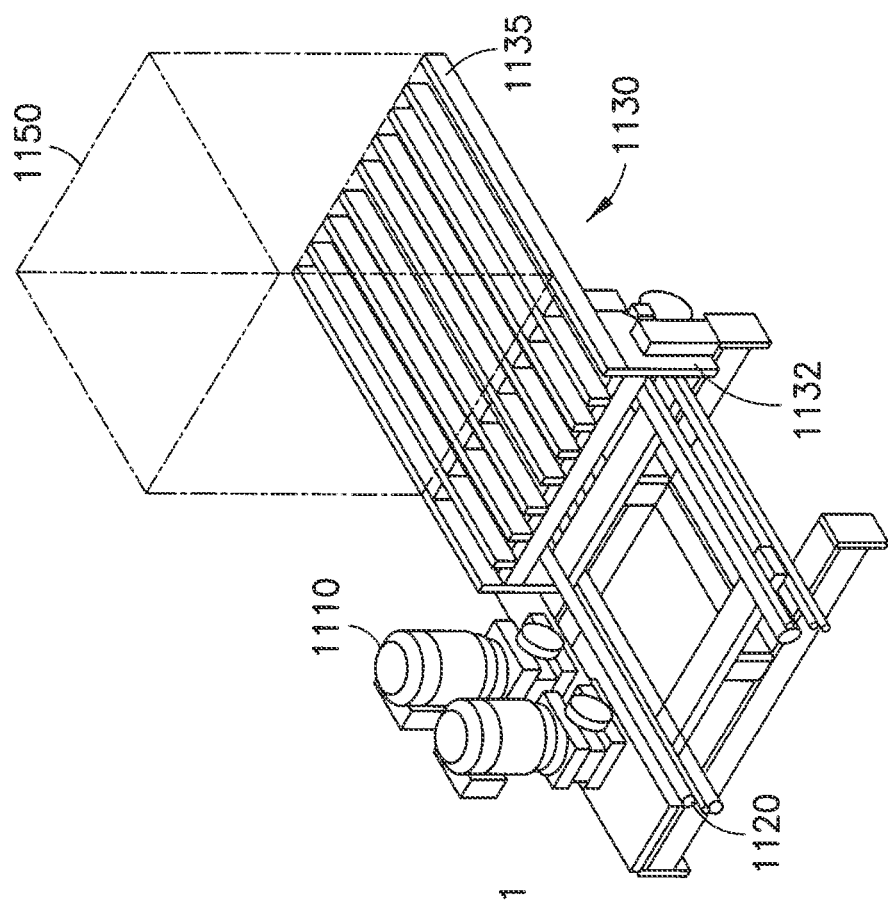
FIGS. 6A-6D schematically illustrate a transfer station in accordance with the embodiments.
Figure 6A:
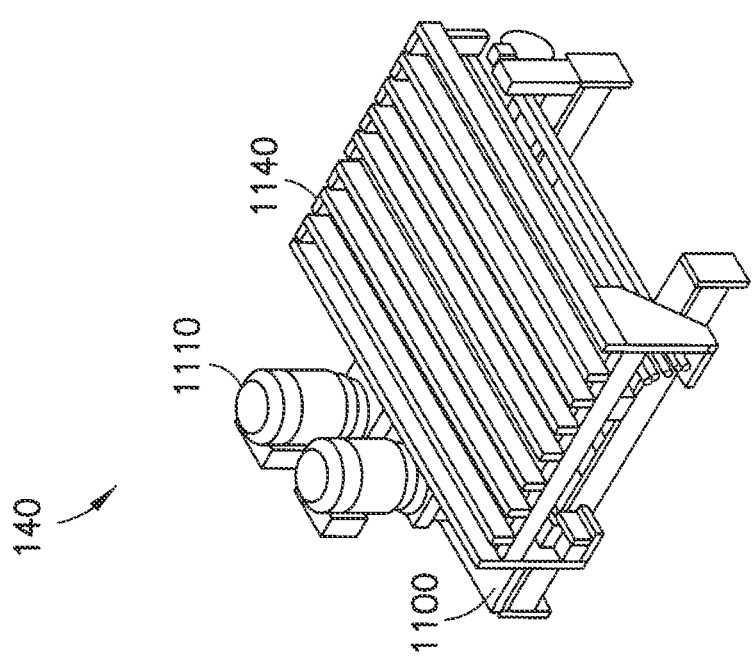

Each bot transfer station 140 may include a frame 1100, one or more drive motors 1110 and a carriage system 1130. The frame 1100 may have any suitable configuration for coupling the bot transfer station 140 to, for example, any suitable supporting feature of the storage structure 130, such as a horizontal or vertical support. The carriage system 1130 may be movably mounted to the frame 1100 through, for example, rails 1120 that are configured to allow the carriage system 1130 to move between retracted and extended positions as shown in FIGS. 6A and 6B. The carriage system 1130 may include a carriage base 1132 and fingers 1135. The fingers 1135 may be mounted to the carriage base 1132 in a spaced apart arrangement so that the fingers 1135 extend from the carriage base 1132 in a cantilevered fashion. It is noted that each finger 1135 may be removably mounted to the carriage base 1132 for facilitating replacement or repair of individual fingers 1135. In the embodiments the fingers and carriage base may be of unitary one-piece construction. The fingers 1135 of the bot transfer stations 140 may be configured to pass between the fingers 910 (FIG. 4) of the shelves 730 of the multilevel vertical conveyors 150A (FIG. 1) for removing pickfaces such as pickfaces 1150 (which may be substantially similar to pickfaces 750-753) from the shelves 730. The bot transfer station 140 may also include a load positioning device 1140 that retractably extends between, for example, the spaced apart fingers 1135 in the direction of arrow 1181 for effecting positioning of the pickfaces 1150 in a predetermined orientation relative to the bot transfer station 140. In the embodiments the carriage system 1130 may have any suitable configuration and/or components. The one or more drive motors 1110 may be any suitable motors mounted to the frame 1100 for causing the extension/retraction of the carriage system 1130 and the extension/retraction of the positioning device 1140 in any suitable manner such as by, for exemplary purposes only, drive belts or chains. In the embodiments, the carriage system and positioning device may be extended and retracted in any suitable manner.

Figure 6D:
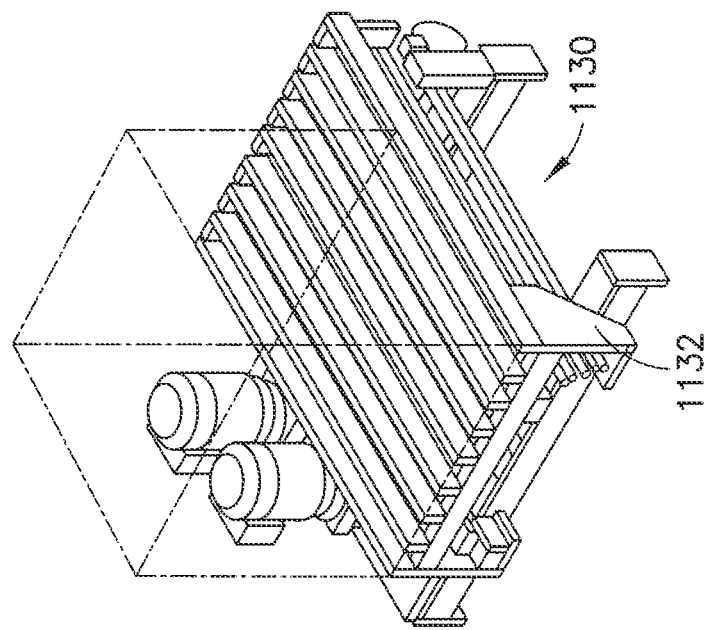
Figure 6C:
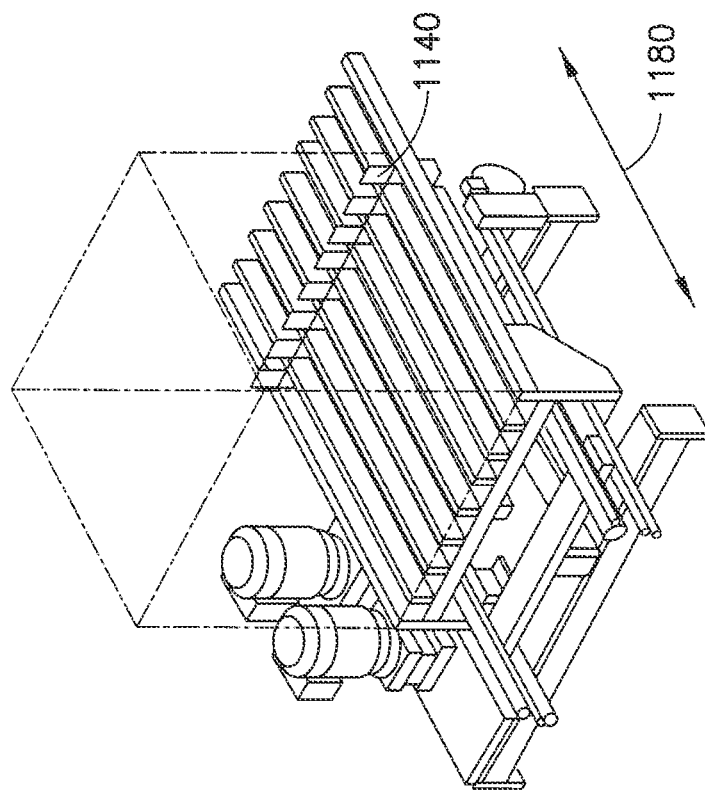
Figure 8:
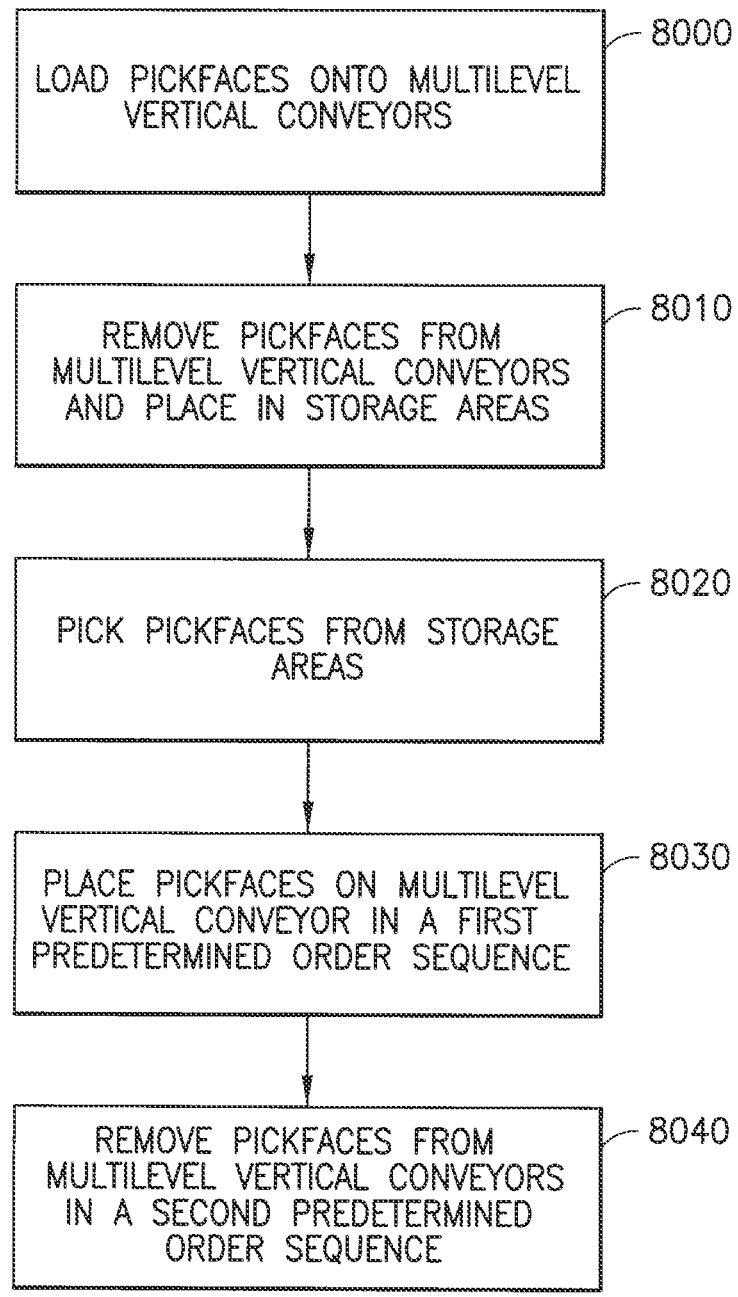
FIG. 8 is a flow diagram of a method in accordance with the embodiments.

In operation, referring also to FIGS. 2C, 2D, 3A and 3B, inbound pickfaces (e.g. pickfaces, which include one or more case units, that are being transferred into the storage and retrieval system) such as pickface 1150 are loaded on and will circulate around the multilevel vertical conveyor 150A and be removed from a respective conveyor by, for example, one or more bots 110 for placement in a storage area of the storage structure (FIG. 8, Blocks 8000 and 8010). As will be described further below, in the embodiments the input loading sequencing of case units onto the multilevel vertical conveyors 150A, 150B (e.g. such as at corresponding feeder input sides of transfer stations 170 and bot transfer locations on respective storage levels) may be substantially independent from the output or unloading sequence of the multilevel vertical conveyors 150A, 150B (e.g. such as at corresponding output sides of transfer stations 160 and bot transfer locations on respective storage levels) and vice versa. In one example, the pickface 1150 may be loaded onto the shelves 730 during an upward travel of the multilevel vertical conveyor 150A and off loaded from the shelves 730 during downward travel of the multilevel vertical conveyor 150A. By way of example, multilevel vertical conveyor shelves 730*i* and 730*ii* (FIG. 2D) may be loaded sequentially, but when unloaded, shelf 730*ii* may be unloaded before shelf 730*i*. It is noted that the shelves 730 may be loaded through one or more cycles of the multilevel vertical conveyor. In the embodiments the pickfaces may be loaded or off loaded from the shelves 730 in any suitable manner. As may be realized, the position of the case units on the multilevel vertical conveyor shelf 730 defines the pickface position that the bot 110 picks from. Accordingly, as may be realized, shudder of the pickface conveyor is highly undesired, especially in that a pickface(s) may remain on the conveyor for more than one cycle after being loaded. The bot may be configured to pick any suitable load or pickface from the shelf 730 regardless of the pickface position on the shelf 730 or the size of the pickface. In the embodiments, the storage and retrieval system 100 may include a bot positioning system for positioning the bot adjacent the shelves 730 for picking a desired pickface from a predetermined one of the shelves 730 (e.g. the bot 110 is positioned so as to be aligned with the pickface). The bot positioning system may also be configured to correlate the extension of a bot transfer arm with the movement (e.g. speed and location) of the shelves 730 so that the transfer arm is extended and retracted to remove (or place) pickfaces from predetermined shelves 730 of the multilevel vertical conveyors 150A, 150B. For exemplary purposes only, the bot 110 may be instructed by, for example, the computer workstation 700 or control server 120 (FIG. 2A) to extend the transfer arm into the path of travel of the pickface 1150. As the pickface 1150 is carried by the multilevel vertical conveyor 150A in the direction of arrow 860 fingers of the bot transfer arm (which may be substantially similar to fingers 1135 of the bot transfer station 140) pass through the fingers 910 of the shelf 730 for transferring the pickface 1150 from the shelf 730 to the carriage system 1135 (e.g. the pickface 1150 is lifted from the fingers 910 via relative movement of the shelf 730 and the bot transfer arm). As may be realized, the pitch P between shelves may be any suitable distance for allowing the transfer of pickfaces between the multilevel vertical conveyor and the bots 110 while the shelves 730 are circulating around the multilevel vertical conveyor at a substantially continuous rate. The bot transfer arm may be retracted (in a manner substantially similar to that shown in FIGS. 6C, 6D with respect to the bot transfer station 140) so that the pickface 1150 is no longer located in the path of travel of the shelves 730 of the multilevel vertical conveyor 150A. It is noted that in the embodiments, where the bot transfer stations 140 are used, the positioning device 1140 may be extended through the fingers 1135 and the carriage system 1130 (FIGS. 6A-6D) may be moved in the direction of arrow 1180 for abutting the pickface 1150 against the positioning device 1140 effecting positioning of the pickface 1150 in a predetermined orientation relative to, for example, the bot transfer station 140. The carriage system 1130 may be fully retracted as shown in FIG. 6D for transfer of the pickface 1150 to a bot 110.

Figure 3A:
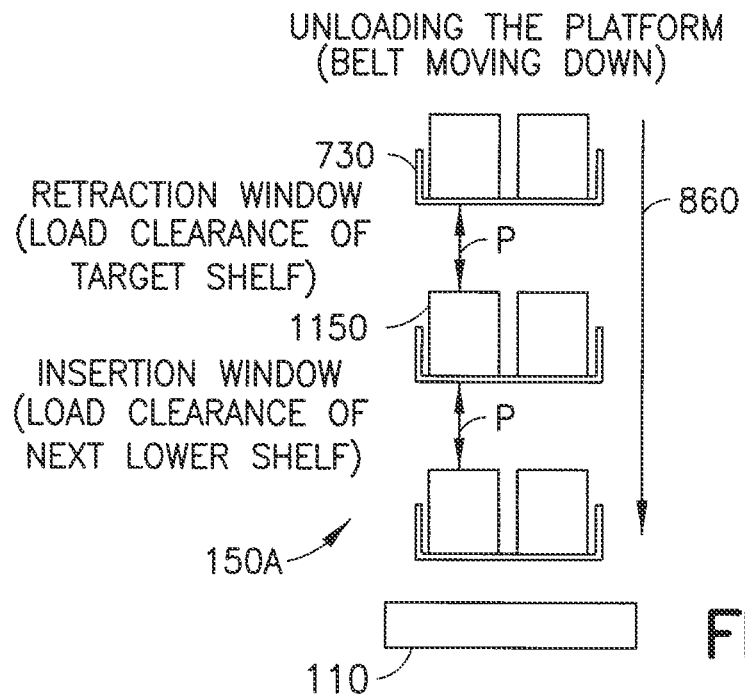
Figure 3B:
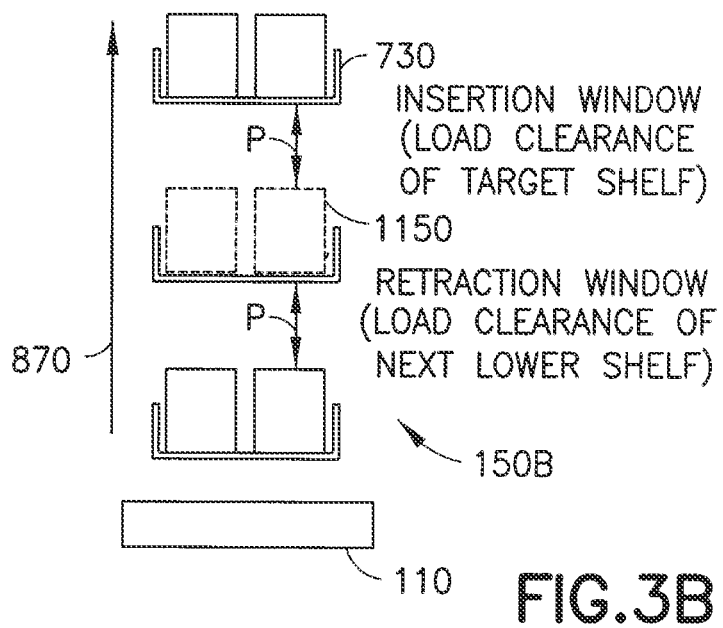

Referring to FIGS. 2D and 3B, for transferring loads in the outbound direction (e.g. moving pickfaces from or out of the storage and retrieval system) the bots 110 pick one or more pickface, such as pickface 1150, from a respective predetermined storage area of the storage structure (FIG. 8, Block 8020). The pickfaces may be extended into the path of the shelves 730 of the multilevel vertical conveyor 150B (which is substantially similar to conveyor 150A) by the transfer arm of bot 110 through an extension of the bot transfer arm relative to a frame of the bot 110. It is noted that the pickfaces, such as pickface 1150, may be placed on the multilevel vertical conveyor 150 in a first predetermined order sequence (FIG. 8, Block 8030). The first predetermined order may be any suitable order. The substantially continuous rate of movement of the shelves 730 in the direction of arrow 870 cause the fingers 910 of the shelf 730 to pass through the fingers of the bot transfer arm such that the movement of the shelf 730 effects lifting the pickface 1150 from the fingers of the bot transfer arm. The pickface 1150 travels around the multilevel vertical conveyor 150B to an out-feed transfer station 160 (which is substantially similar to in-feed transfer station 170) where it is removed from the shelf 730 by a conveyor mechanism 1030 in a manner substantially similar to that described above. The pickfaces may be removed from the multilevel vertical conveyor 150B by, for example the out-feed transfer stations 160 in a second predetermined order sequence that may be different and independent from the first predetermined order sequence (FIG. 8, Block 8040). The second predetermined order sequence may depend on any suitable factors such as, for example, the store plan rules described below. As noted before, to effect transfer of pickface(s) between conveyor stations and bot transfer arm or transfer station in a robot repeatable manner where pickface size and shape may vary with each transfer it is desired that the motion of the pickface(s) on the conveyor be substantially free of shudder of judder.

It is noted that the respective transfer of pickfaces between the multilevel vertical conveyors 150A, 150B and the in-feed and out-feed transfer stations 170, 160 may occur in a manner substantially similar to that described above with respect to the bots 110 and bot transfer stations 140. In the embodiments transfer of pickfaces between the multilevel vertical conveyors 150A, 150B and the in-feed and out-feed transfer stations 170, 160 may occur in any suitable manner.

As can be seen in FIGS. 2C and 2D the shelves 730 of the multilevel vertical conveyors 150A, 150B are loaded and unloaded by the in-feed and out-feed transfer stations 170, 160 and the bots 110 from a common side of the shelf 730. For example, the shelves are loaded and unloaded in the common direction 999 (e.g. from only one side of the shelf 730). In this example, to facilitate loading the multilevel vertical conveyor from only one side of the shelf, the multilevel vertical conveyors 150A, 150B circumscribe a respective one of the in-feed and out-feed transfer stations 170, 160 so that the pickfaces 1150 travel around the in-feed and out-feed transfer stations 170, 160. This allows the in-feed and out-feed transfer stations 170, 160 to be placed on the same side of the shelves 730 as the bots 110 for transferring pickfaces (and the case units therein) to and from the multilevel vertical conveyors 150A, 150B.

Figure 7:
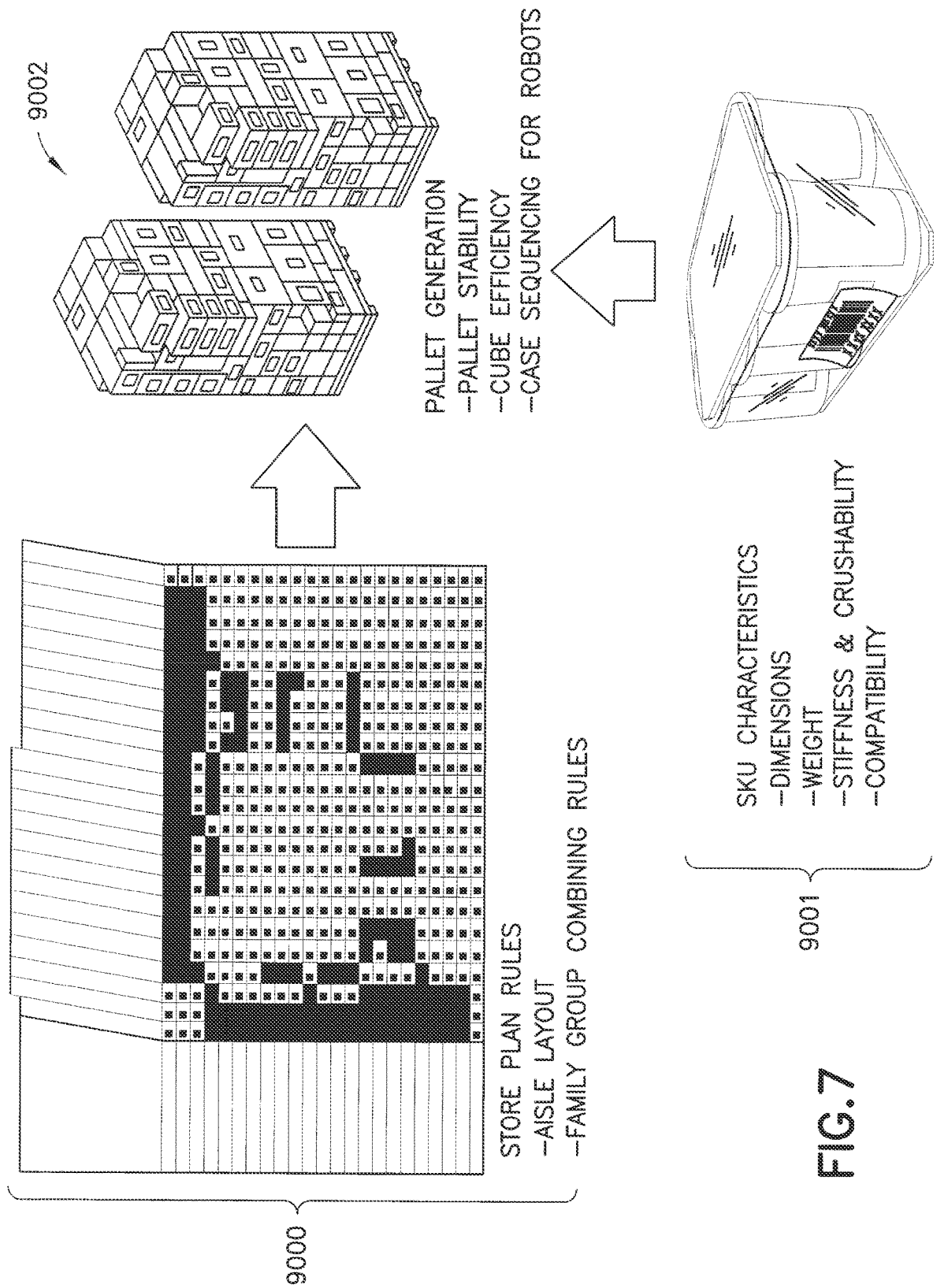
FIG. 7 is a schematic illustration of a method in accordance with the embodiments.

It is noted that the control server 120 may be configured to order the removal of case units from the storage and retrieval system for any suitable purpose, in addition to order fulfillment. In the embodiments, the distribution (e.g. sortation) of case units in the storage and retrieval system is such that the case units in the conveyor can be provided for delivery to a palletizing station in any suitable order at any desired rate using only two sortation sequences. The control server 120 may also be configured to incorporate, for example, store plan rules when fulfilling orders so that the cases are provided by the bots 110 to respective multilevel vertical conveyors 150B in a first predetermined sequence (e.g. a first sortation of case units for optimizing the utilization and throughputs of the bots) and then removed from the respective multilevel vertical conveyors 150B in a second predetermined sequence (e.g. a second sortation of case units for optimizing the utilization and throughput of a palletizing device and to permit arrangement of cases within the pallet in a manner optimized for facilitating unloading and distribution at a retail delivery point or facility) so that the case units may be placed on pallets or other suitable shipping containers/devices) in a predetermined order for building mixed pallets (see e.g. FIG. 8 described above). For example, in the first sortation of case units the bots 110 may pick respective case units (e.g. case unit) in any order. The bots 110 may traverse the picking aisles and transfer deck (e.g. circulate around the transfer deck) with the picked item until a predetermined time when the item is to be delivered to a predetermined multilevel vertical conveyor 150B. In the second sortation of case units, once the case units are on the multilevel vertical conveyor 150B the case units may circulate around the conveyor until a predetermined time when the items are to be delivered to the out-feed transfer station 160. Referring to FIG. 7, it is noted that the order of case units delivered to the pallets may correspond to, for example, store plan rules 9000. The store plan rules 9000 may incorporate, for example, an aisle layout in the customer's store or a family group of case units corresponding to, for example, a particular location in the store where the pallet will be unloaded or a type of goods. The order of case units delivered to the pallets may also correspond to characteristics 9001 of the case units such as, for example, compatibility with other case units, dimensions, weight and a durability of the case units. For example, crushable case units may be delivered to the pallet after heavier more durable case units are delivered to the pallet. The first and second sortations of the case units allow for the building of mixed pallets 9002 as described below.

The control server 120 in combination with the structural/mechanical architecture of the storage and retrieval system enables maximum load balancing. As described herein, the storage spaces/storage locations are decoupled from the transport of the case units through the storage and retrieval system. For example, the storage volume (e.g. the distribution of case units in storage) is independent of and does not affect throughput of the case units through the storage and retrieval system. The storage array space may be substantially uniformly distributed with respect to output. The horizontal sortation (at each level) and high speed bots 110 and the vertical sortation by the multilevel vertical conveyors 150B substantially creates a storage array space that is substantially uniformly distributed relative to an output location from the storage array (e.g. an out-feed transfer station 160 of a multilevel vertical conveyor 150B). The substantially uniformly distributed storage space array also allows case units to be output at a desired substantially constant rate from each out-feed transfer station 160 such that the case units are provided in any desired order. To effect the maximum load balancing, the control architecture of the control server 120 may be such that the control server 120 does not relate the storage spaces within the storage structure 130 (e.g. the storage array) to the multilevel vertical conveyors 150B based on a geographical location of the storage spaces (which would result in a virtual partitioning of the storage spaces) relative to the multilevel vertical conveyors 150B (e.g. the closest storage spaces to the multilevel vertical conveyor are not allocated to cases moving from/to that multilevel vertical conveyor). Rather, the control server 120 may map the storage spaces uniformly to each multilevel vertical conveyor 150B and then select bots 110, storage locations and output multilevel vertical conveyor 150B shelf placement so that case units from any location in the storage structure come out from any desired multilevel vertical conveyor output (e.g. at the out-feed transfer stations) at a predetermined substantially constant rate in a desired order for building the mixed pallets 9002.

Figure 9A:
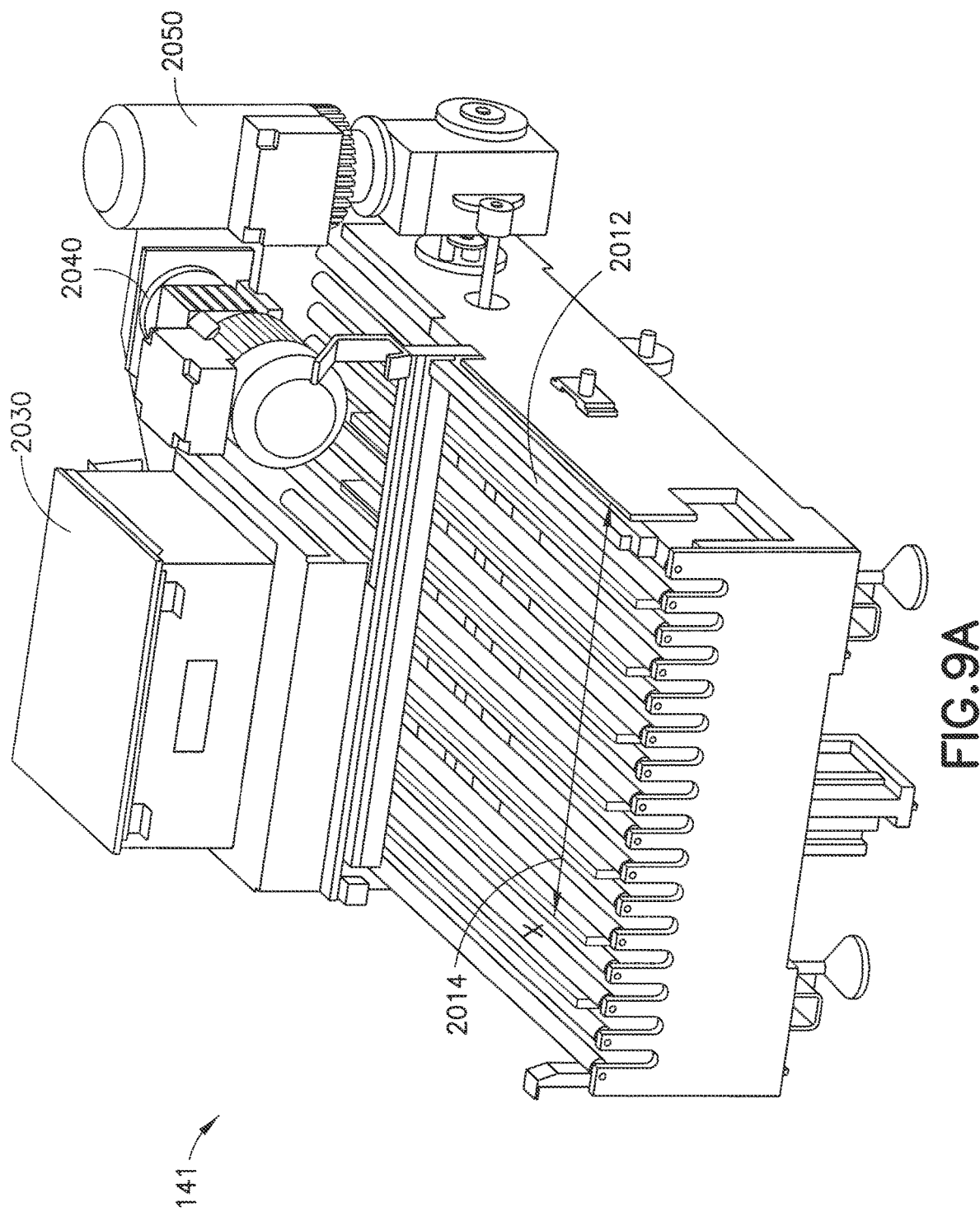
FIGS. 9A and 9B illustrate a feed station in accordance with the embodiments.
Figure 9B:
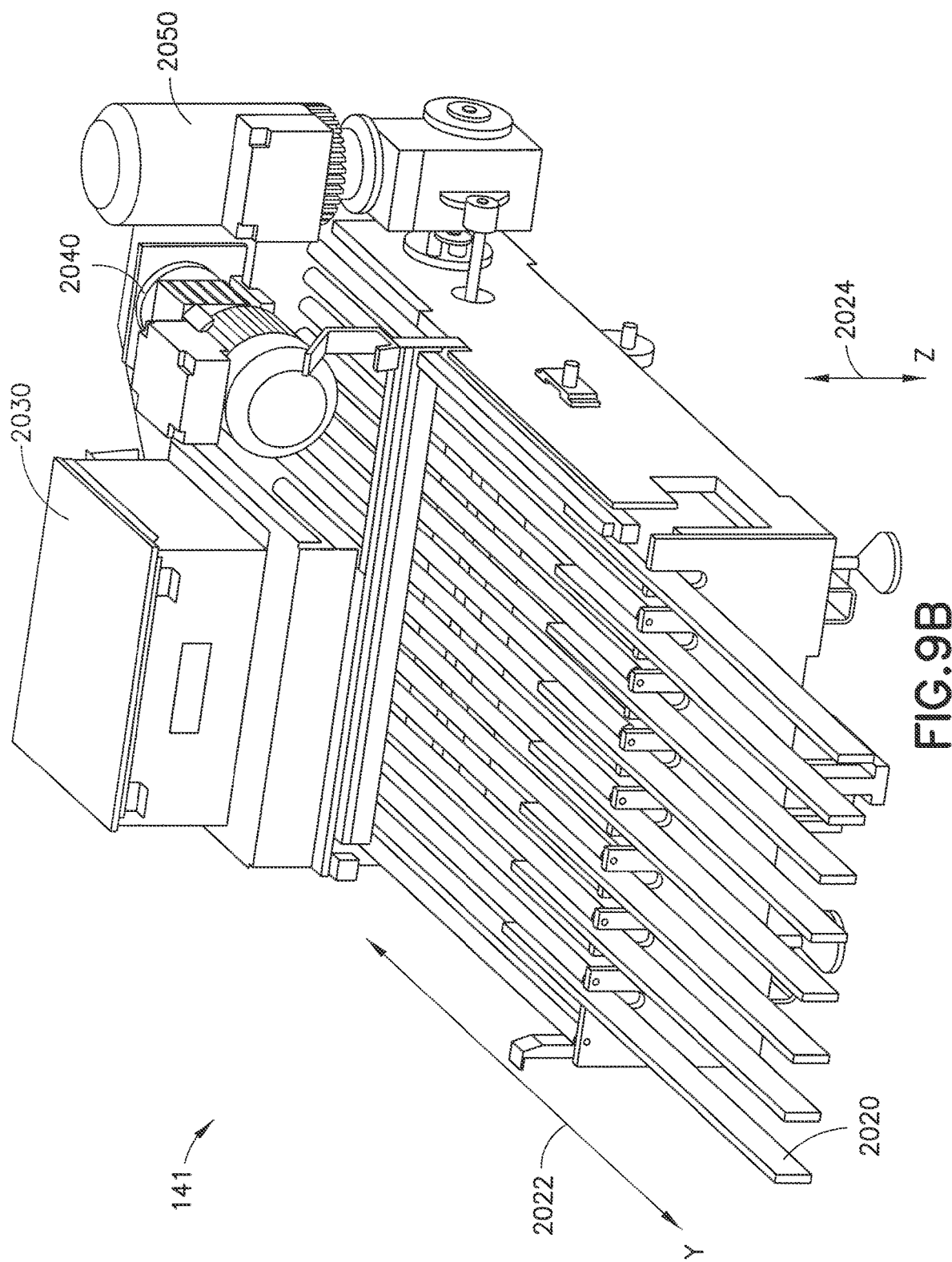
Figure 10:
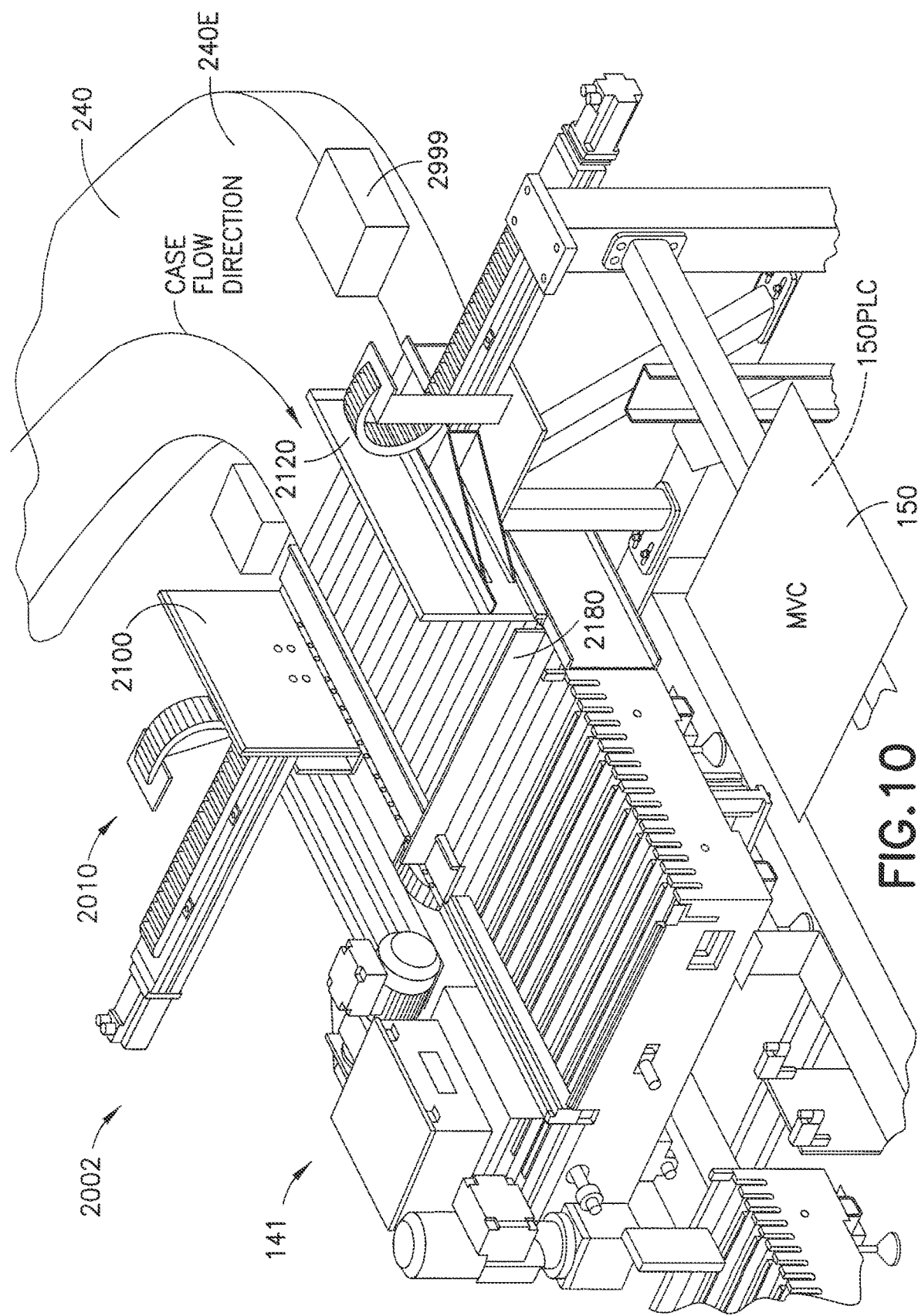
FIG. 10 illustrates a pickface builder in accordance with the embodiments.
Figure 11:
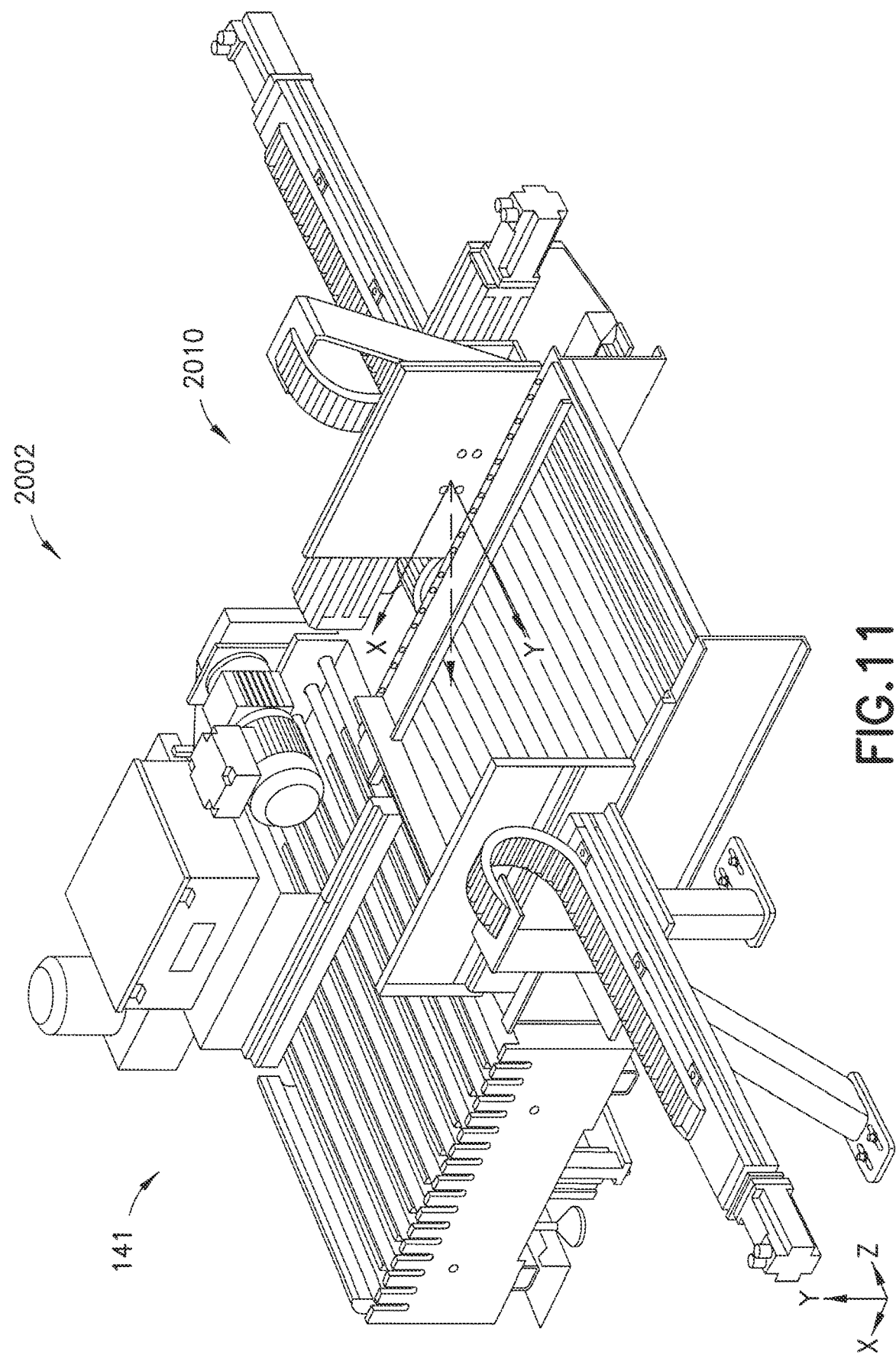
FIG. 11 illustrates a pickface builder in accordance with the embodiments.
Figure 12:
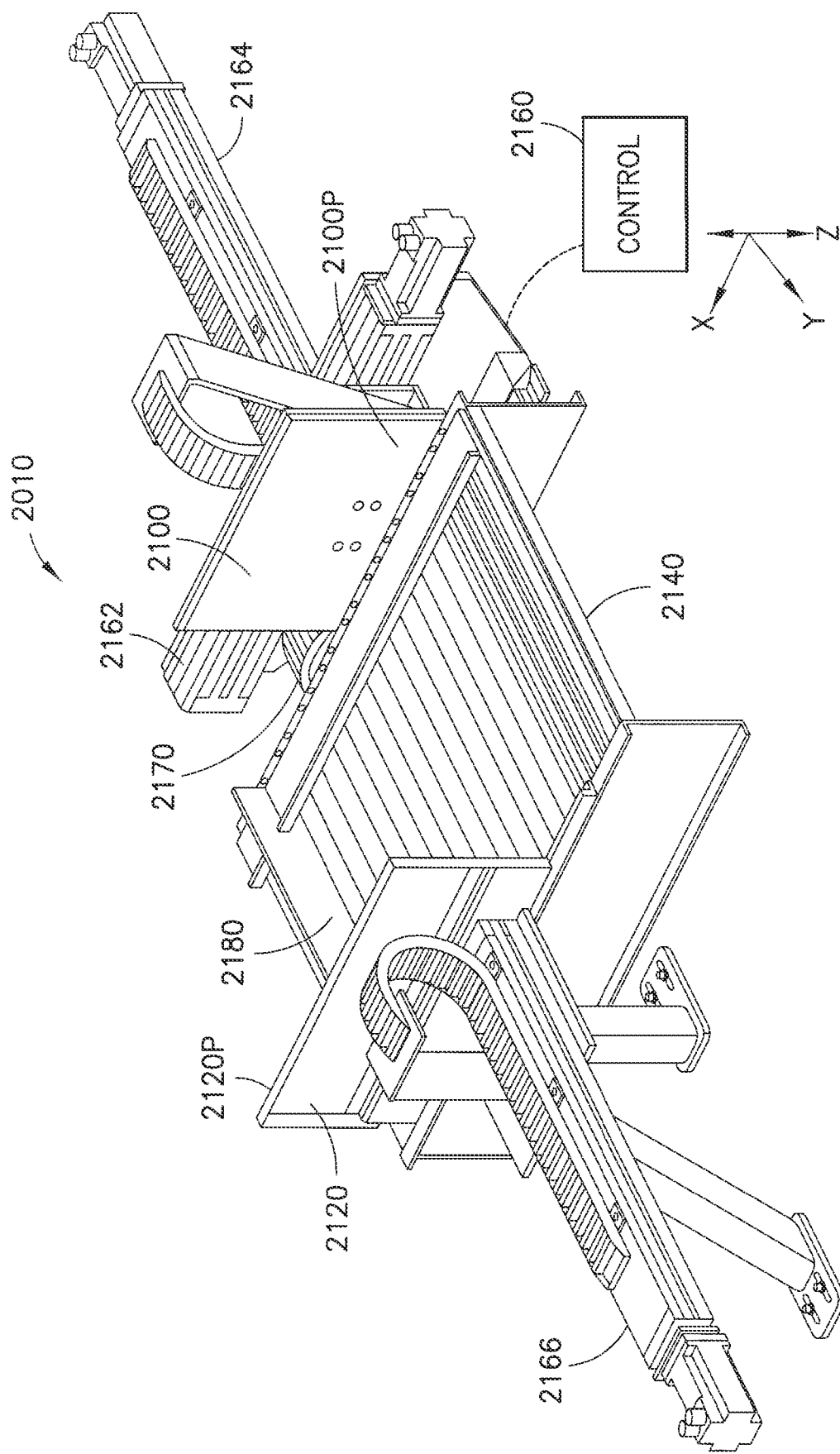
FIG. 12 illustrates a pickface builder in accordance with the embodiments.

Referring now to FIGS. 9A and 9B, there is shown feed station 141 in accordance with the embodiments. In addition to the features described below, station 141 may be substantially similar to out-feed and in-feed stations 160, 170. Feed station 141 may be an automated device that can be configured to either transfer payloads referred to as pickfaces, cases or otherwise into an MVC and onto a platform or out of an MVC from the platform. In one example, the feed station 141 interfaces, for example, the pickface builder 2010 (FIGS. 10-12) to the shelves 731 (FIG. 13) of the multilevel vertical conveyor(s) 150 (FIG. 10). In the embodiments, feed station 141 may be used to transfer material to or from any suitable device, station or otherwise. In one example, the feed station 141 receives a pickface from the pickface builder 2010. The feed station may have any suitable pickface positioning features that position a reference datum (e.g. pickface datum) of the pickface (relative to a transfer device of the feed station) at a predetermined position on the multilevel vertical conveyor shelf 731 so that the bots 110 (FIG. 1) can pick the pickfaces from the shelf 731. It is noted that the pickface datum relates the pickface to a placement position of the cases that form the pickface along a storage surface, such as e.g. the storage shelves 600, of the storage and retrieval system. The transfer device of the feed station 141 may translate to effect the handoff of the pickface to the shelf 731. In the embodiments the handoff may occur in any suitable manner. The feed station 141 may have any suitable controller to operate the transfer device in a predetermined sequence with the multilevel vertical conveyor 150 and interact with the pickface builder 2010.

Feed station 141 has driven roller bed 2112 to transfer in the x-axis 2014. Feed station 141 has a set of extendable or retractable fingers and payload bed 2020 that traverses in the y-axis 2022 and PLC with controls 2030. Rollers 2012 may be selectively driven by drive motor and transmission 2040 where sensors may be provided to detect the presence, edges or otherwise of the payload to be transported and used in conjunction with encoders or otherwise with controller 2030 to position the payload as desired. Gear motor 2050 may be provided to selectively traverse bed 2020 in the y direction 2022. A z axis drive (not shown) may be provided to move bed 2020 in the z direction 2024 to effect a pick or place to rollers 2012. Feed station's 141 y-axis motion may be coordinated to transfer loads, for example, payloads, cases or otherwise from or onto the MVC platforms 730, 731 by positioning feed station fingers 2020 to accept or pass off the payload to or from the platform 730, 731. Feed station 141 transfers the payload between x and y-axis 2014, 2022 through a z-axis 2024 lift of the fingers 2020. With a pickface payload on rollers 2012, once fingers 2020 are lifted, a y-axis move in direction 2022, that may extend fingers 2020, may take place to allow the payload to be transported to the appropriate MVC (in a manner similar to that shown in FIG. 5). An opposite sequence may take place when transferring a payload from an MVC platform, for example, platform 730 or 731 as will be described, to feed station 141 where fingers 2020 retract in the y-axis direction 2022 and then lower in the z-axis direction 2024 to transfer a pickface payload to the roller bed 2012 for removal. As such, feed station 141 provides for an automated device that can be configured to either transfer payloads or cases into an MVC and onto a platform or out of an MVC from the platform. As may be realized, the pickface payload being output by an output MVC from the storage and retrieval system different than the input pickface payload. For example, as input pickface transported and loaded to a corresponding storage space in the storage structure and comprising more than one case(s) may be portioned during retrieval so that a sub-set of the input pickface are retrieved, and the retrieved pickface is different than the input pickface.

Referring now to FIGS. 10-14C there is shown pickface builder arrangement 2002 having pickface builder 2010 and feed station 141. Pickface builder 2010, which may hereinafter be referred to as PFB may be an automated device to align a single or multiple cases or pickface units to form the single or multiple pickface payload for picking, placing or otherwise to be transferred in any suitable direction or otherwise and to be used in conjunction with any suitable conveyance, transport device or otherwise. Although pickface builder 2010 may be described with respect to transfer station 141, pickface builder 2010 may be utilized with or without any transfer station, transport system or otherwise. Further, more or less features may be provided with pickface builder 2010. For example, transport features such as associated with transfer station 141 or otherwise may be incorporated into pickface builder 2010 and more or less sensing, alignment or other suitable features may be provided.

The pickface builder 2002 may be located in any suitable area of the storage and retrieval system 100 in-feed conveyance system. In one example, the pickface builder 2010 may be located between the conveyor 240 (see also FIG. 5) and the multilevel vertical conveyor 150. For example, in the embodiments the pickface builder 2010 may be arranged downstream from (e.g. adjacent to or offset from) a turn in elbow 240E of the conveyor 240 (e.g. to change a direction of the flow of cases for interfacing with the multilevel vertical conveyor 150) and upstream of the feed station 141. In the embodiments, the conveyor 150 may not have a turn in elbow in which case the pickface builder may interface with a substantially straight conveyor. In the embodiments the pickface builder may be located downstream the multilevel vertical conveyors and upstream of a bot interface where the pickfaces are transferred to the bots. The pickface builder 2010 may be configured to arrange and compile a set (e.g. one or more) of cases to build a pickface of cases (e.g. contained or uncontained cases). Each pickface is picked (as a unit) by bots 110 for placement and retrieval in the storage racks of the storage structure 130 and/or the shelves 731 of the multilevel vertical conveyors 150. In the embodiments shown in the figures the pickface builder 2010 communicates with the multilevel vertical conveyors 150 through the feed station 141 so that pickfaces are transferred (as a unit) to the multilevel vertical conveyors 150 after the pickface is built. In the embodiments, each pickface builder 2010 may be linked to a dedicated position of the multilevel vertical conveyor shelves 731, such as where the shelves 731 have more than one pickface holding location 2280, 2290 (FIG. 13). In the embodiments each pickface builder may be configured to selectively feed cases to each pickface holding location 2280, 2290 of the shelves 731 (e.g. a common pickface builder for one or more shelf positions). In the embodiments, the pickface builder 2010 may adjoin a side of a respective feed station 141 and be disposed so that cases of the pickface exit the pickface builder, through any suitable drive unit, and enter the feed station 141 in a direction that is angled (e.g. substantially orthogonal) relative to the direction in which the feed station transfers the pickface to the multilevel vertical conveyor. In the embodiments, the cases may be arranged at any suitable angle relative to the direction or travel of the pickface from the feed station 141 to the multilevel vertical conveyor 150.

Pickface builder 2010 may have x-y axis pusher 2100 (or a single axis, e.g. y axis, pusher), y-axis snugger 2120, roller bed 2140 and PLC controls 2160. In one example, the pusher 2100 may have any suitable type and number of pusher plates 2100P for pushing cases across a support surface (which may be movable) of the pickface builder 2010. The pusher plate(s) 2100P may be resilient and may be positioned to engage cases such that the cases can be pushed as they move along the direction of travel on the conveyor 240 (e.g. the pusher 2100 is configured to drive the pusher plates 2100P along the x and y directions) for positioning cases on the pickface builder 2010 for building the pickface. The x-y axis pusher 2100 may be located to receive cases such that the direction of the flow of cases from the conveyor 240 is towards the pusher (e.g. the conveyor discharges cases substantially in front of or adjacent the pusher). In one example, the case configuration upon receipt by the pusher 2100 may be such that a long axis of the cases is oriented to interface with the pusher 2100. In another example, the short axis of the cases may be oriented to interface with the pusher 2100 (e.g. the cases may have any suitable orientation relative to the pusher 2100). In still other examples, the cases may have mixed orientations when interfacing with the pusher 2100 (e.g. some cases interface the pusher via a long axis of the case and other cases interface with the pusher via the short axis of the case). The x-y axis pusher 2100 directs cases from the conveyor 240 towards the snugger 2120.

The snugger 2120 includes any suitable type and number of snugger plates 2120P that are positioned substantially opposite the pusher 2100 and substantially transverse to the direction of case travel between, for example, feed station 141 and the multilevel vertical conveyor 150. In one example, the snugger establishes a pickface pick datum. For example, the snugger 2120 may be movable in at least the y direction (e.g. towards the pusher plate 2100P) to establish a pickface datum reference when, for example, the pusher 2100 pushes cases up against the snugger 2120 (or vice versa) for substantially aligning and snugging the cases (that form a pickface) together. In one example, the snugger 2120 may be spring loaded in any suitable manner. In the embodiments the snugger may not be spring loaded. The pickface builder 2010 transfers to and collates the aligned cases (e.g. pickfaces) on the feed station 141 for subsequent transfer to the multilevel vertical conveyor 150. In one example, the pickface builder operates so that the snugger 2120 receives an initial case of the pickface and other cases of the pickface are abutted against the initial case as will be described below. In the embodiments the cases of the pickface may be arranged so that one or more cases of the pickface are in substantial contact with the snugger plate 2120P for establishing the pickface datum reference.

Pickface builder pusher 2100 and snugger 2120 have linear actuators 2162, 2164, 2166 driven by servo motors. In the embodiments, any suitable actuator, linear or otherwise may be provided, for example, any suitable other linear motion technologies. In the embodiments, PFB motion is triggered by a sensor 2170 in the pusher 2100, which follows a payload or case throughout travel of pusher 2100 to provide positive presence detection throughout the x-y motion of pusher 2100. PFB 2010 uses gate 2180 to halt x-axis motion of the payload until the full pickface has been built and snugged where the pickface may consist of one or more cases or payloads and where the snugging may consist of positioning cases or payloads adjacent one another or at any suitable location with respect to each other. Here, pickface builder 2010 pusher 2100 moves in an x-y motion profile that varies (depending on physical characteristics of the payload including, but not limited to, case dimensions, mass, packaging materials and fragility) and the PFB snugger 2120 moves in a y-axis profile which may be normal to the direction of payload travel or otherwise that varies depending on an aggregate of all payload or case dimensions in a given pickface. PFB snugger 2120 may compress all payloads or as is in the pickface in the y-axis to present a compact aggregate of payloads for picking, placing or subsequent transport. PFB roller bed 2140 may be a motor driven conveyor that provides payload or case motion in the x-axis. In the embodiments, any suitable form of conveyor such as belt, or a static bed with other means of x-axis conveyance may be provided for use in conjunction with pusher 2100 and/or snugger 2120. As such, pickface builder 2010 may provide an automated device to align multiple payloads or cases to present the aggregate for picking, placing or otherwise transferring to or from MVC 150A, B or C or other suitable transport device.

The pickface builder 2010 may be connected to, for example, any suitable controller such as a programmable logic controller, micro-controller or control server 120 in any suitable manner. In the embodiments, information from, for example, the control server 120 identifies any suitable ID (identification) data (e.g. SKU numbers, case dimensions, etc.) for each of the incoming cases (e.g. cases being placed on and travelling on conveyor 240). For exemplary purposes only, the ID data may be case specific (such as with the SKU numbers) and may also relate to storage parameters such as for example, a storage location within the storage and retrieval system the cases are to be stored and/or particulars for the pickface (e.g. case orientation, contents of a pickface, pickface configuration, etc.). In the embodiments the case ID data may be any suitable data related to the cases and/or the storage of the cases within the storage and retrieval system. The case ID data (including, but not limited to, SKU numbers, storage parameters, pickface contents, case dimensions etc.) may be stored locally such as within a memory of the pickface builder 2010 or within a memory of, for example, the control server 120 or any other suitable controller. The case ID data may be stored in any suitable format such as in lookup tables. The controller, such as controller 120 or any other suitable controller, generates, for example, an x, y movement profile of the pusher 2100 and/or a y offset of the snugger 2120 to, for example, establish the datum of the pickface based on any suitable data such as the case ID data or updated data from any suitable sensors (such as infeed resolver 2999) placed along the infeed path of the cases (e.g. along conveyor 240 or any other suitable area of the storage and retrieval system).

In one example, the infeed resolver 2999 may be configured to confirm the ID data of the incoming cases. The data obtained from, for example, the infeed resolver (such as, for example, the case dimensions and/or any other suitable case information) may be transmitted in any suitable manner to the pickface builder 2010 (e.g. directly to the pickface builder or through, for example, control server 120) so that the motion profiles of the pusher 2100 and snugger 2120 are updated to correspond to any observed variances of the cases (with respect to, for example, predetermined case values stored in, for example, the control server or any other suitable controller) as determined by the infeed resolver 2999. In the embodiments, the pickface builder 2010 may be configured in any suitable manner to redirect or discard cases that are determined to be erroneous based on predetermined case data (e.g. expected case data) and, for example, actual case data obtained from the resolver 2999. In the embodiments a separate case inspection station may be provided adjacent the pickface builder 2010 for redirecting and discarding cases. In one example, the pickface builder 2010 may have a gate or other selectably operable unit for removing the erroneous cases from the pickface builder 2010.

As described above, the pickface builder 2010 may be configured to communicate in any suitable manner with, for example, the control server 120 and also a controller 150PLC of an associated multilevel vertical conveyor(s) 150. The pickface builder 2010 may obtain information from the controller 150PLC and/or the control server 120 as to which shelves 731 (see e.g. FIG. 13) of the multilevel vertical conveyor 150 are occupied (e.g. have pickfaces located on the shelves). The pickface builder 2010 may be configured so that pickfaces are not fed to feed station 141 unless an empty shelf 731 is provided on the multilevel vertical conveyor to which the pickface will be transferred. In the embodiments, the pickface builder may be in communication with the feed station 141 so that when a pickface is transferred from the pickface builder 2010 to the feed station 141 the feed station 141 will not transfer the pickface to the multilevel vertical conveyor unless instructed to by the pickface builder 2010. In one example, the pickface builder may be configured to receive data from, for example, the multilevel vertical conveyor 150 and or control server 120 for tracking pickfaces that are transferred to the multilevel vertical conveyor 150. For example, when a pickface is transferred to the multilevel vertical conveyor 150 an identification of the shelf 731 to which the pickface is transferred may be communicated to the pickface builder 2010 so that the pickface builder knows where each pickface is on the multilevel vertical conveyor 150 and which shelves 731 are empty. As another example, in addition to or in lieu of communicating the identification of the shelf to the pickface builder, an identification of the pickface is communicated to the conveyor so that the conveyor knows which pickface, if any, is on each conveyor shelf. As each pickface is removed from the multilevel vertical conveyor 150 the pickface builder 2010 and/or the multilevel vertical conveyor 150 may receive data that indicates the shelf from which the pickface was taken is now empty and available to receive another pickface(s). In the embodiments, the status of the multilevel vertical conveyor shelves may be tracked in any suitable manner (such as with, e.g. any suitable sensing devices disposed along a path of the conveyor shelves 731).

Figure 13A:
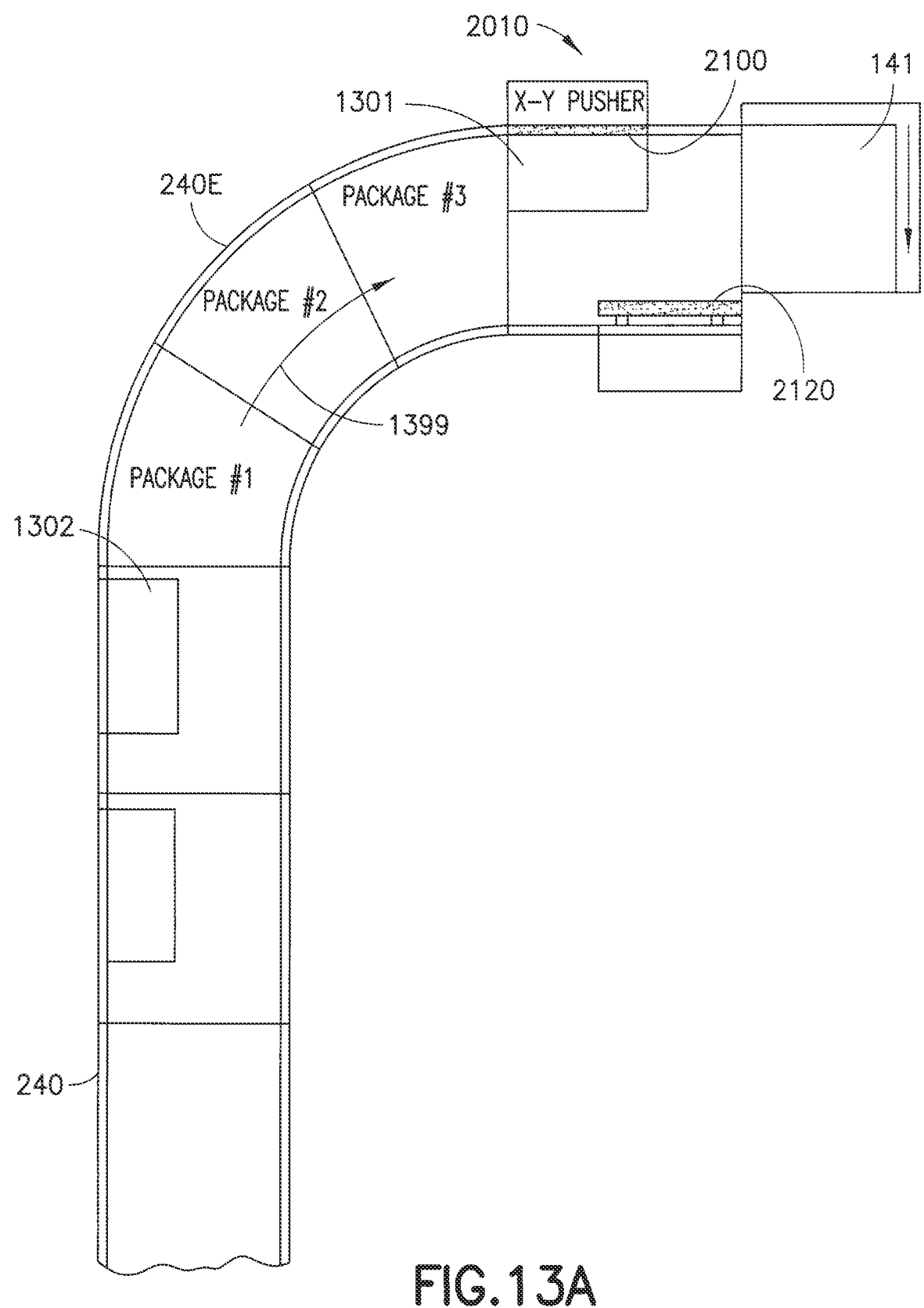
FIGS. 13A-13H and 14A-14C are schematic illustrations of exemplary operations of a portion of the storage and retrieval system in accordance with the exemplary embodiments.
Figure 13B:
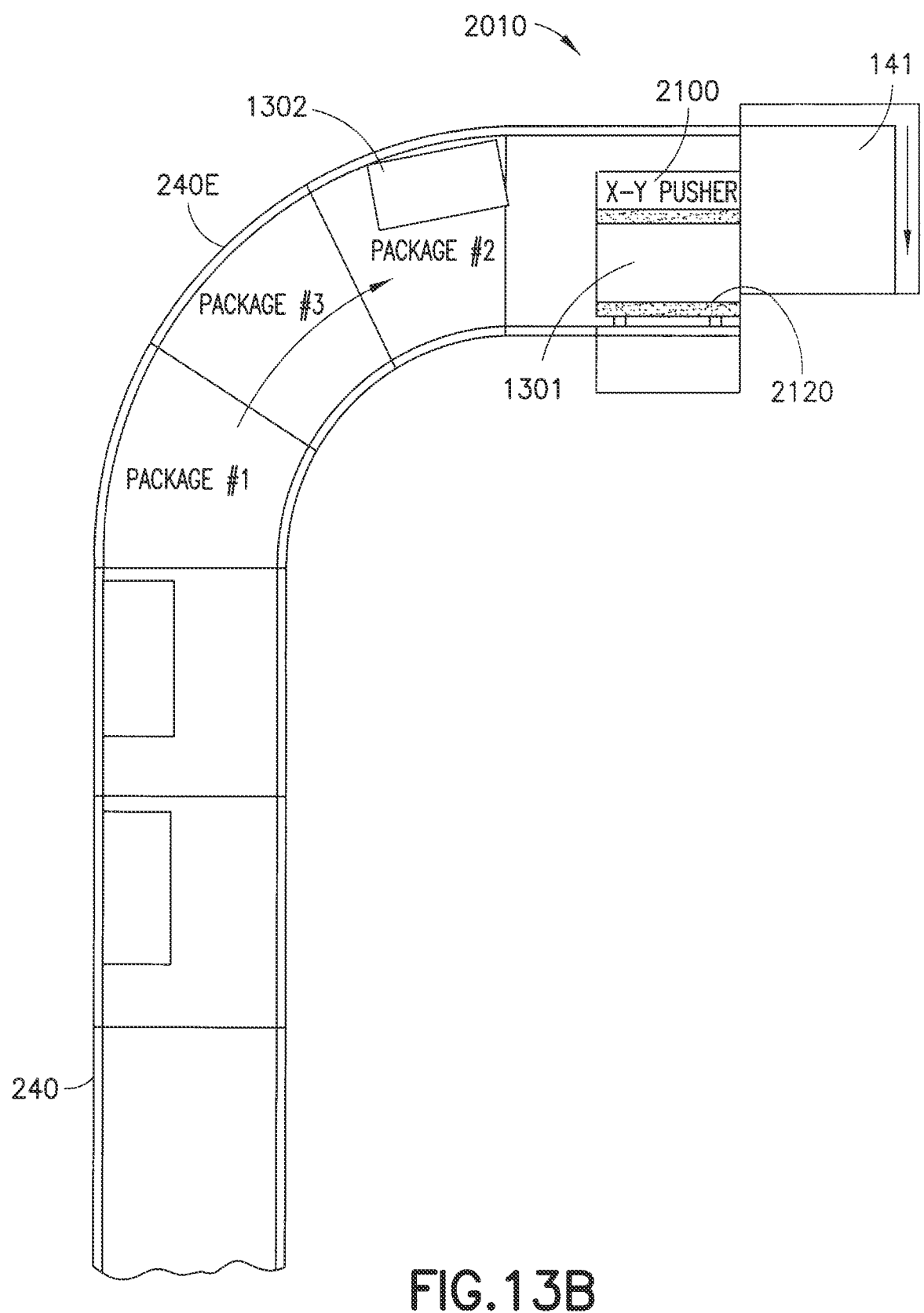
Figure 13C:
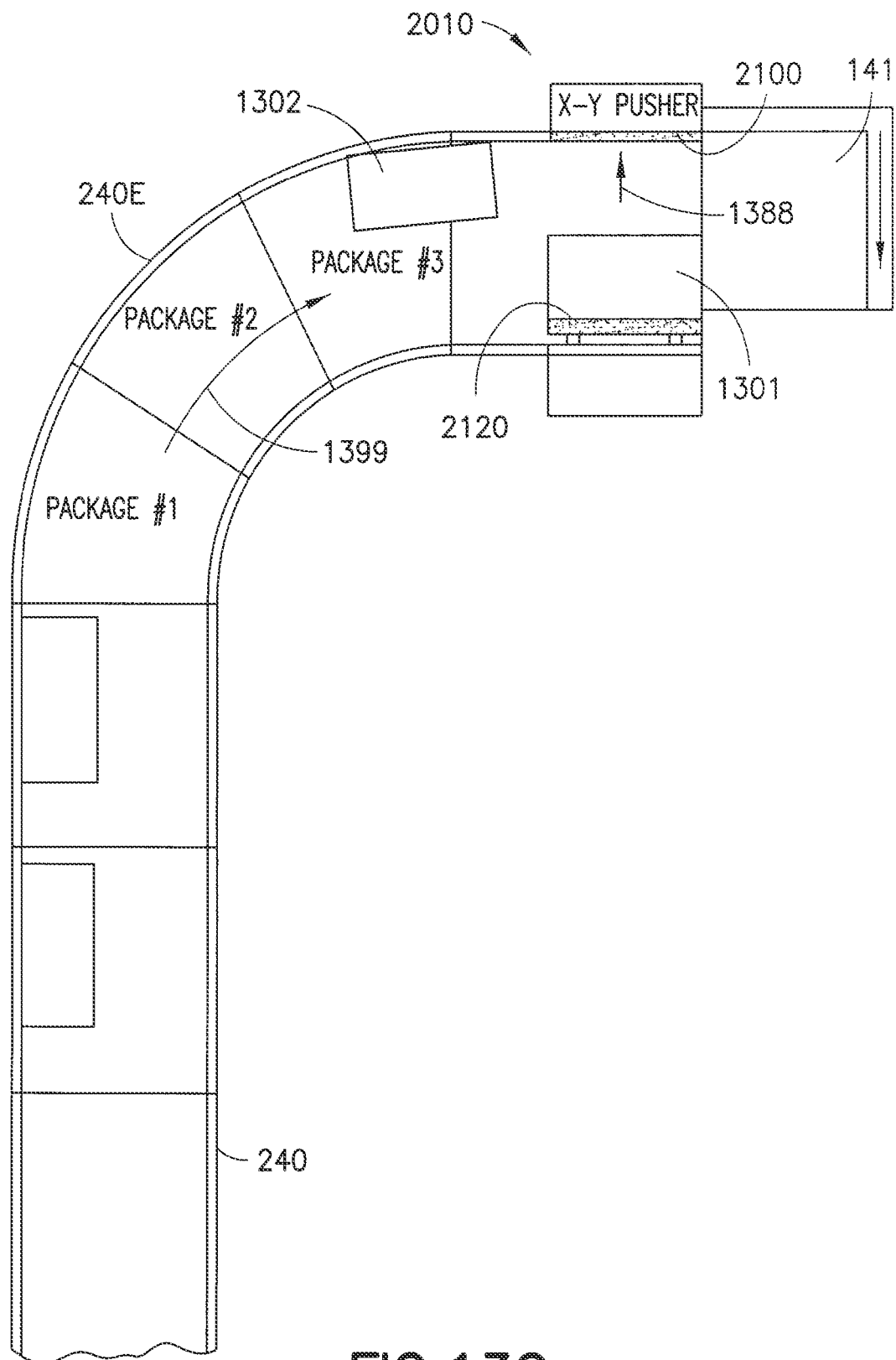
Figure 13D:
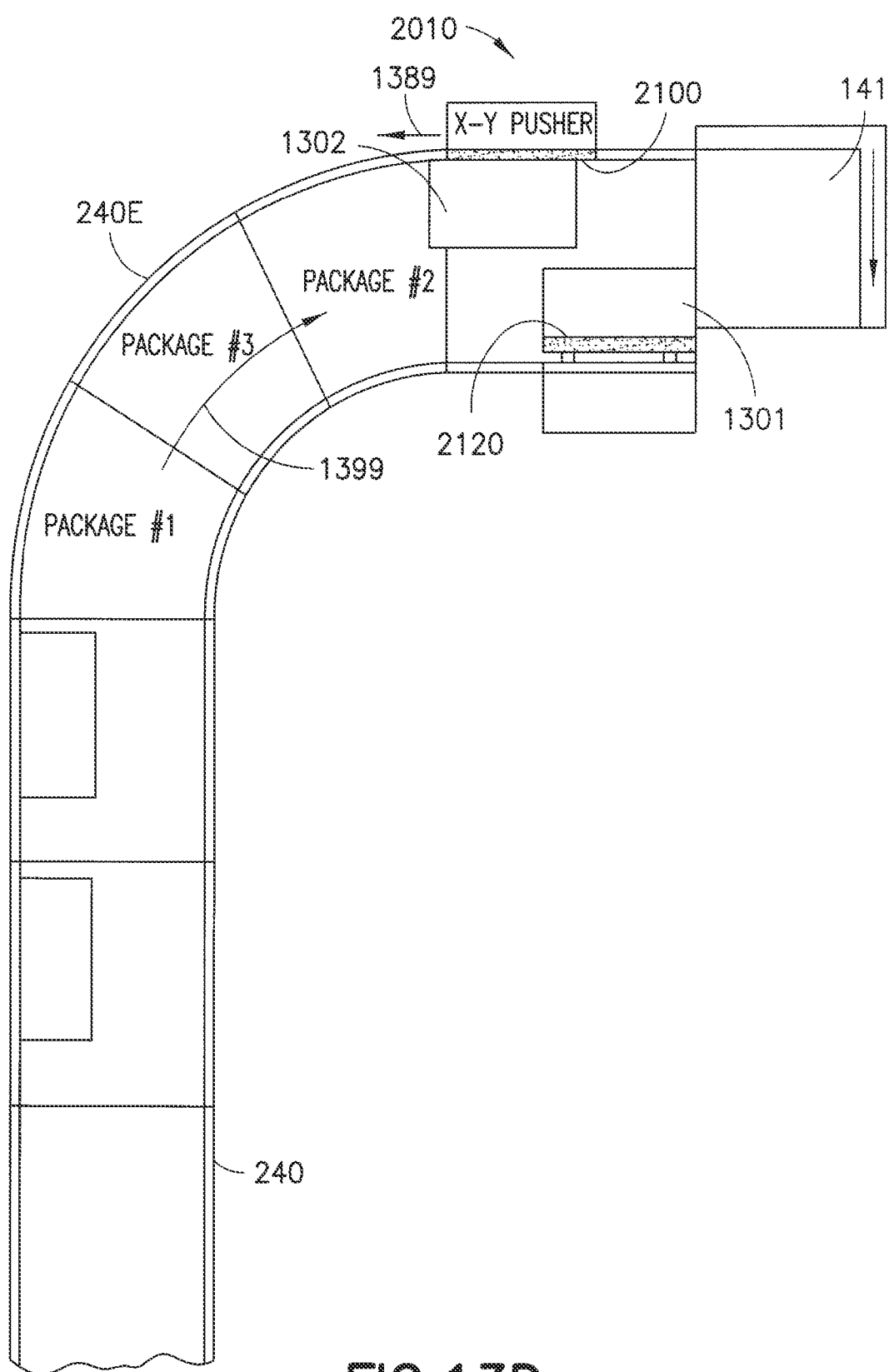
Figure 13E:
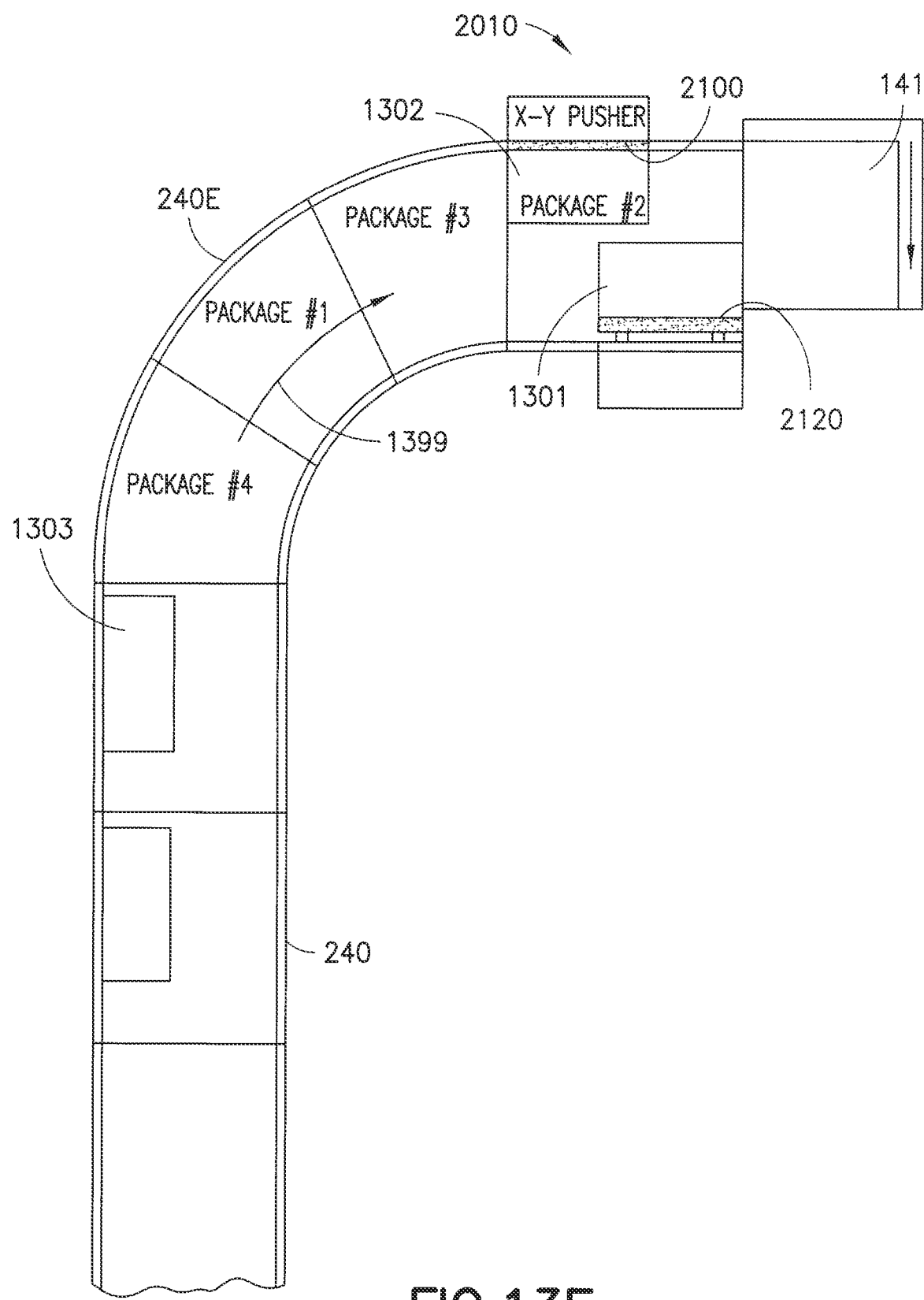
Figure 13F:
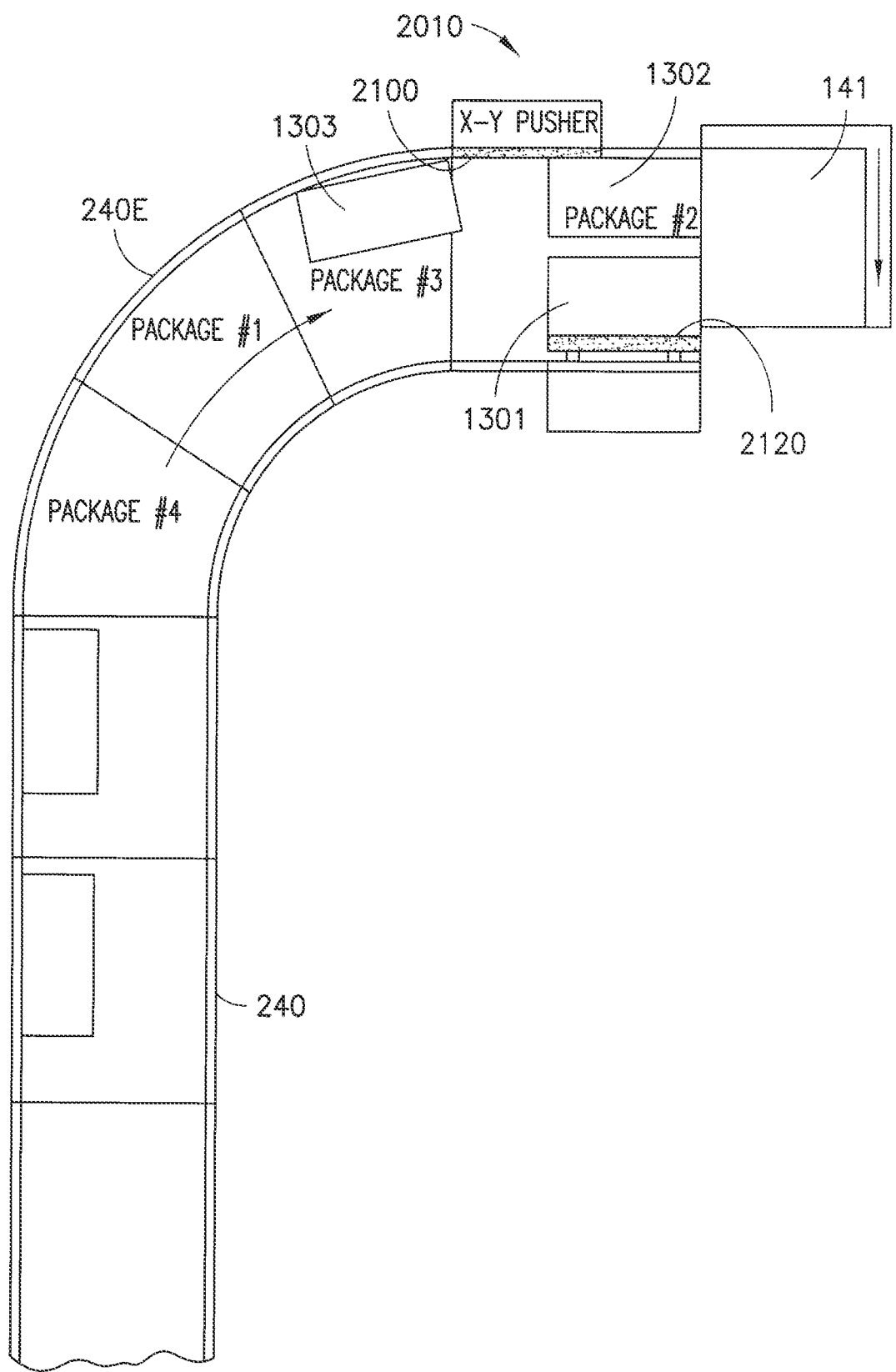
Figure 13G:
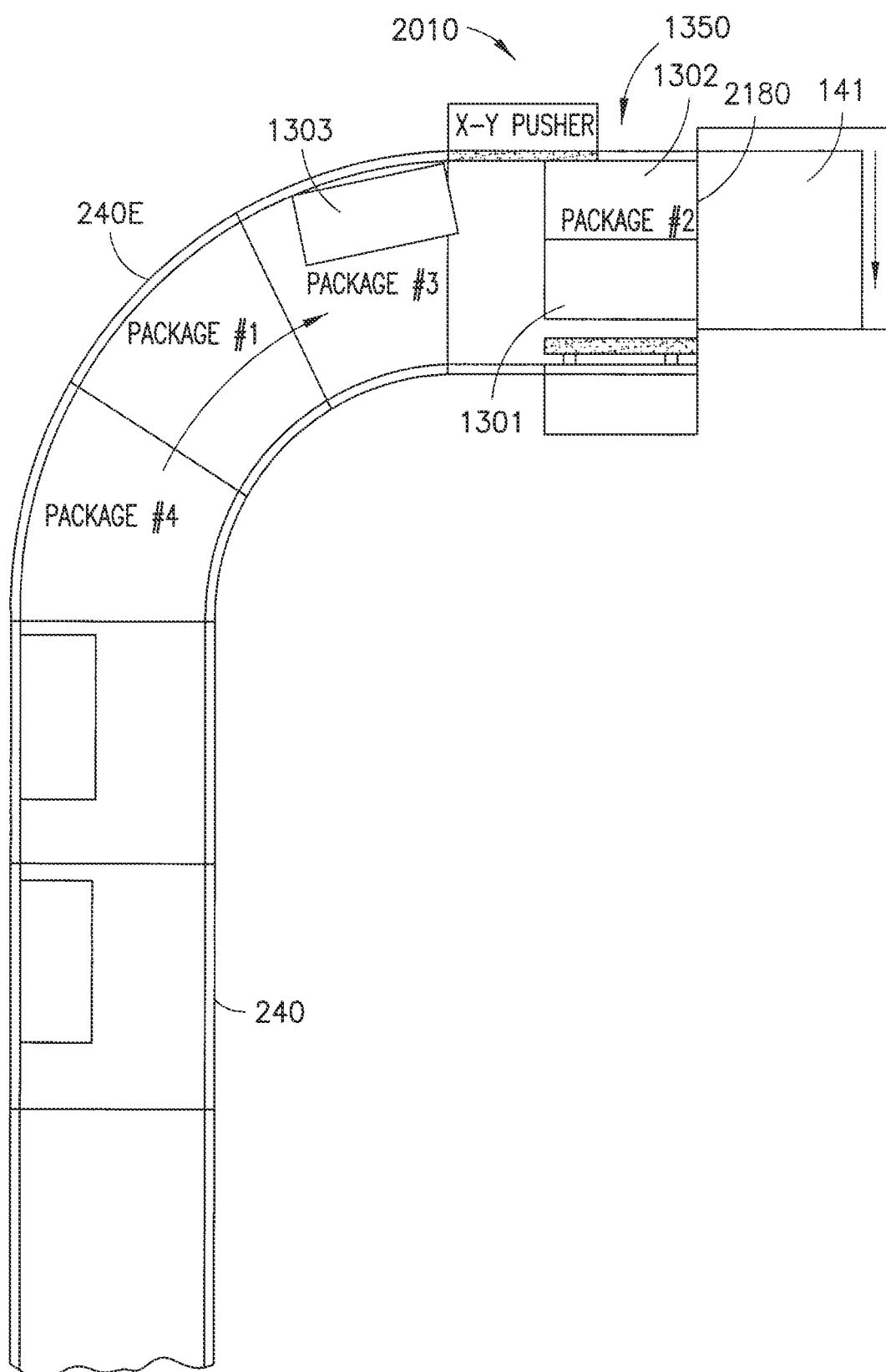
Figure 13H:
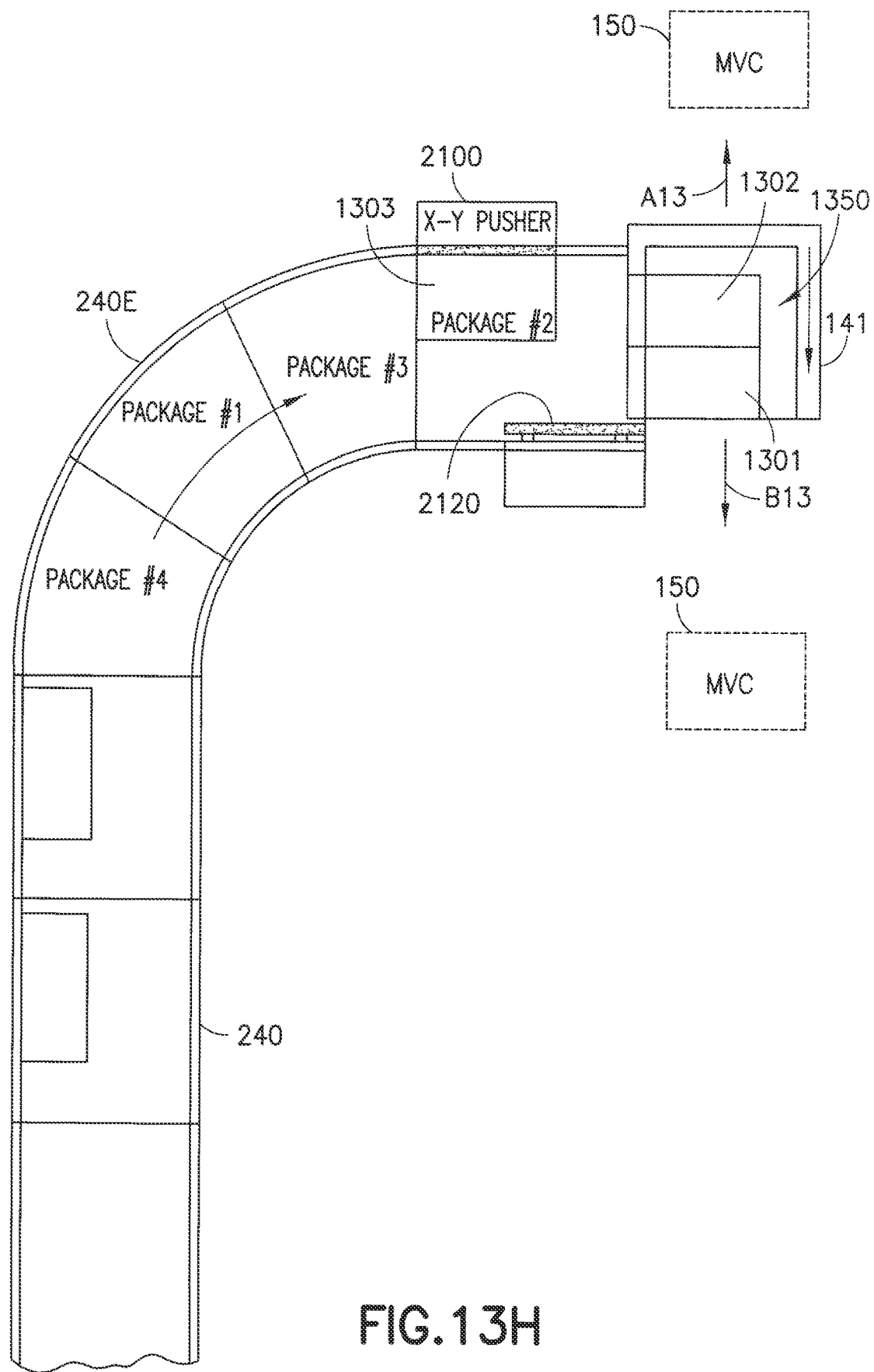
Figure 15:
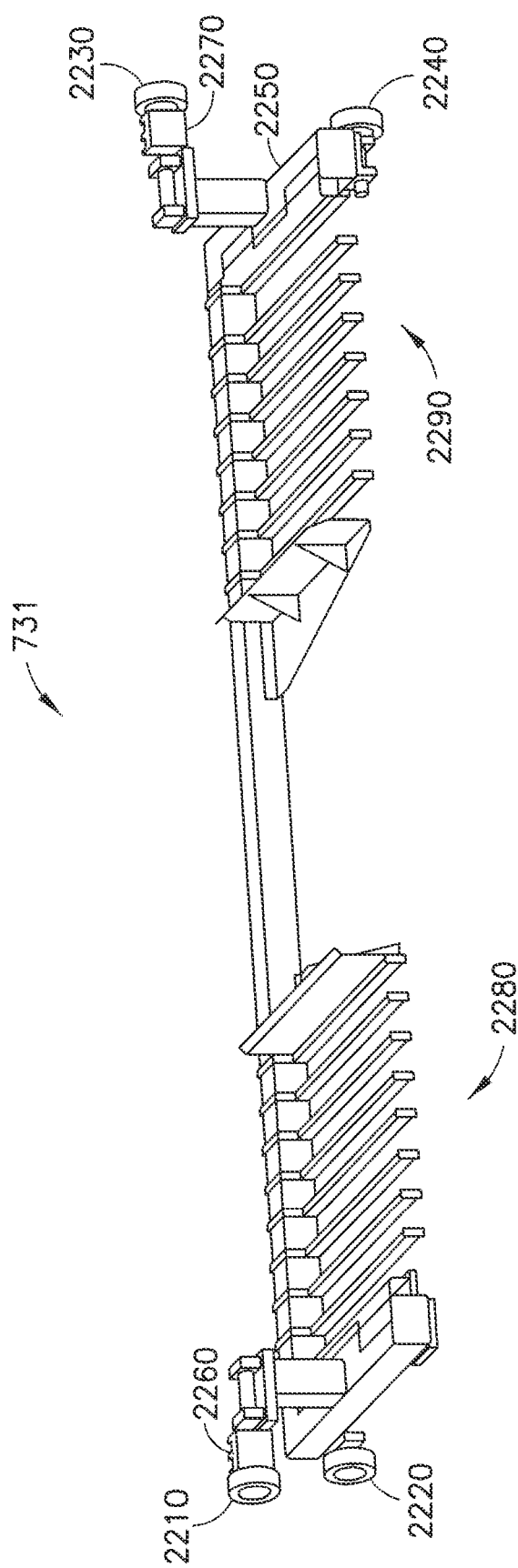
FIG. 15 illustrates a platform in accordance with the embodiments.

In one exemplary operation of the pickface builder (and in-feed conveyor system) cases such as cases 1301, 1302 travel along conveyor 240 in the direction of arrow 1399 towards the pickface builder 2010 (FIG. 13A). The pusher 2100 pushes, for example, a first case 1301 of a pickface towards the snugger 2120 so that the case 1301 is in substantial contact with the snugger 2120 (FIG. 13B). The snugger may also move towards the pusher 2100 to, for example, establish the pickface reference datum. The pusher retracts in the direction of arrows 1388, 1389 away from the case 1301 and returns to its initial position (FIGS. 13C and 13D) so that a second case 1302 of the pickface can be pushed up against (e.g. snugged) against case 1301 (FIGS. 13E and 13D). As may be realized, as the cases are pushed by the pusher 2100 the pusher may move two-dimensionally so that the cases being pushed are also travelling in the direction of travel along the conveyor 240 (e.g. in the direction of arrow 1399). In this example cases 1301, 1302 form pickface 1350 (FIG. 13G) which is held on the pickface builder by gate 2180 until an open shelf of the multilevel vertical conveyor 150 is available. The gate 2180 may be lowered or otherwise moved so that the pickface 1350 is driven off of the pickface builder 2010 in any suitable manner and onto the feed station 141. The feed station may be arranged to transfer the pickface in one or more directions A13, B13 (FIG. 13H), depending on a location of one or more multilevel vertical conveyors 150 for transferring the pickface 1350 to a desired shelf 731 (FIG. 15). As may be realized, as the pickface 1350 is being moved off of the pickface builder another pickface may start to form such that case 1303 (the next case in the line of cases moving along the conveyor 240) is moved adjacent the pusher 2100 so that pickfaces are substantially continuously being built.

Figure 14A:
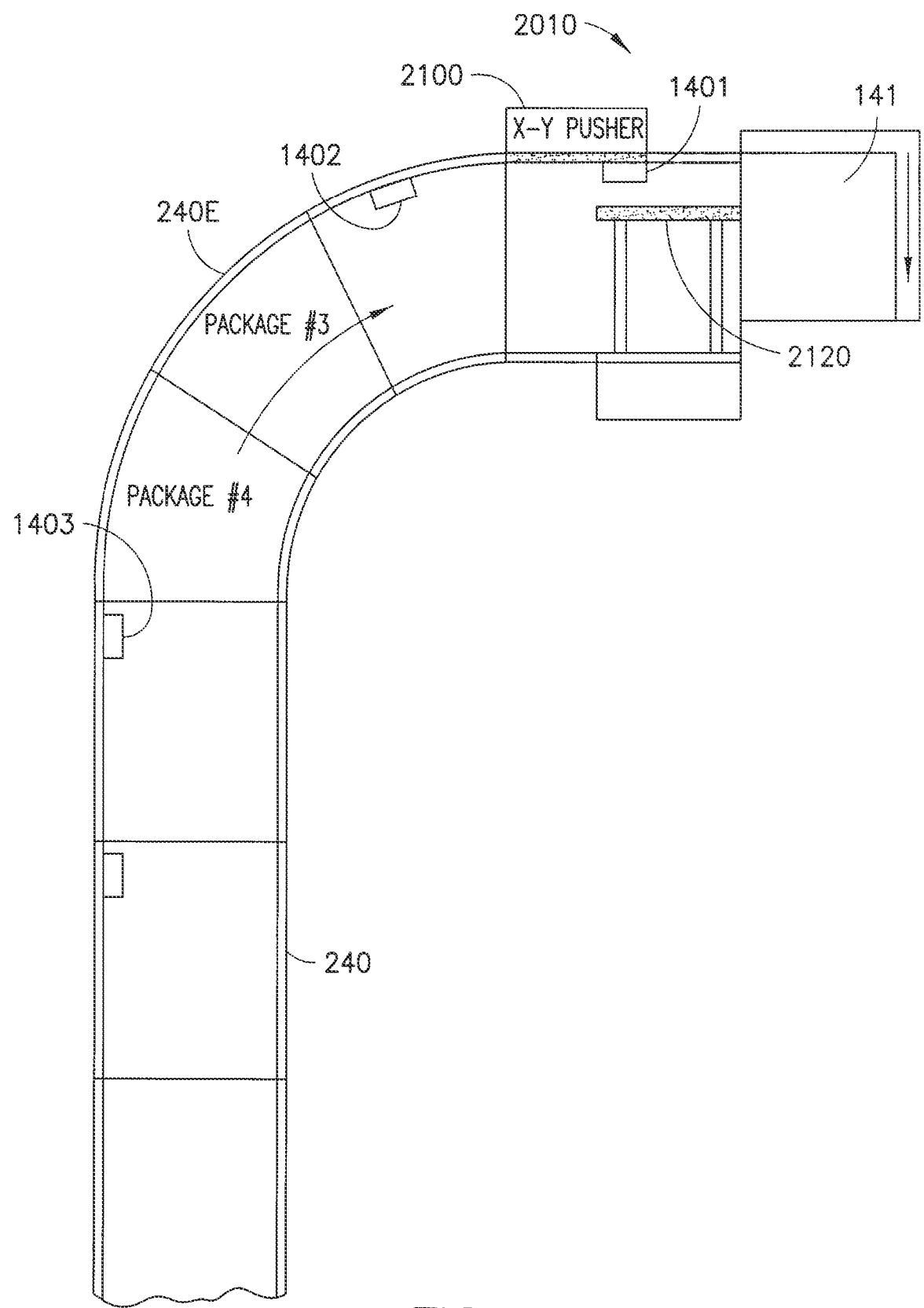
Figure 14B:
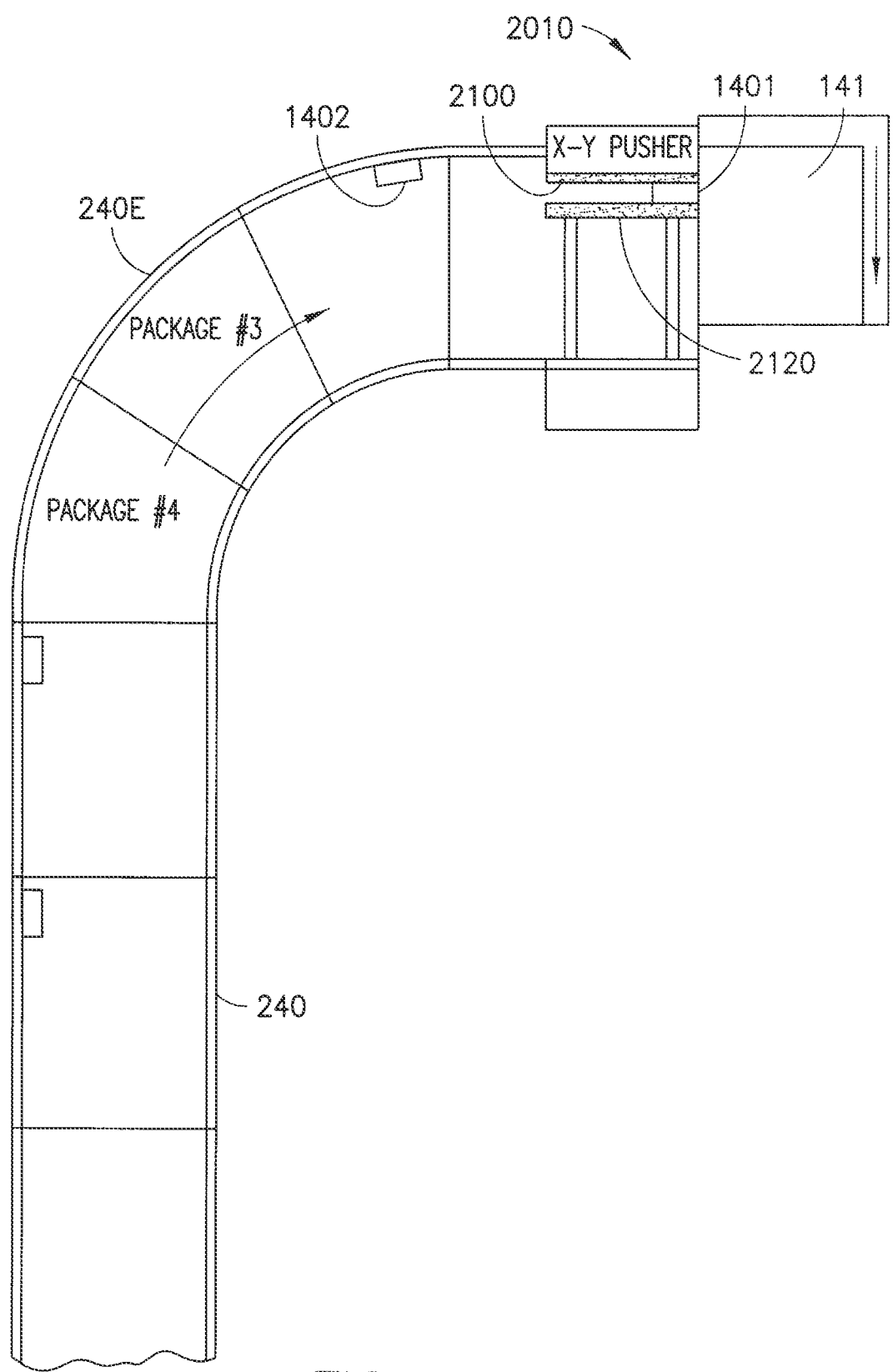
Figure 14C:
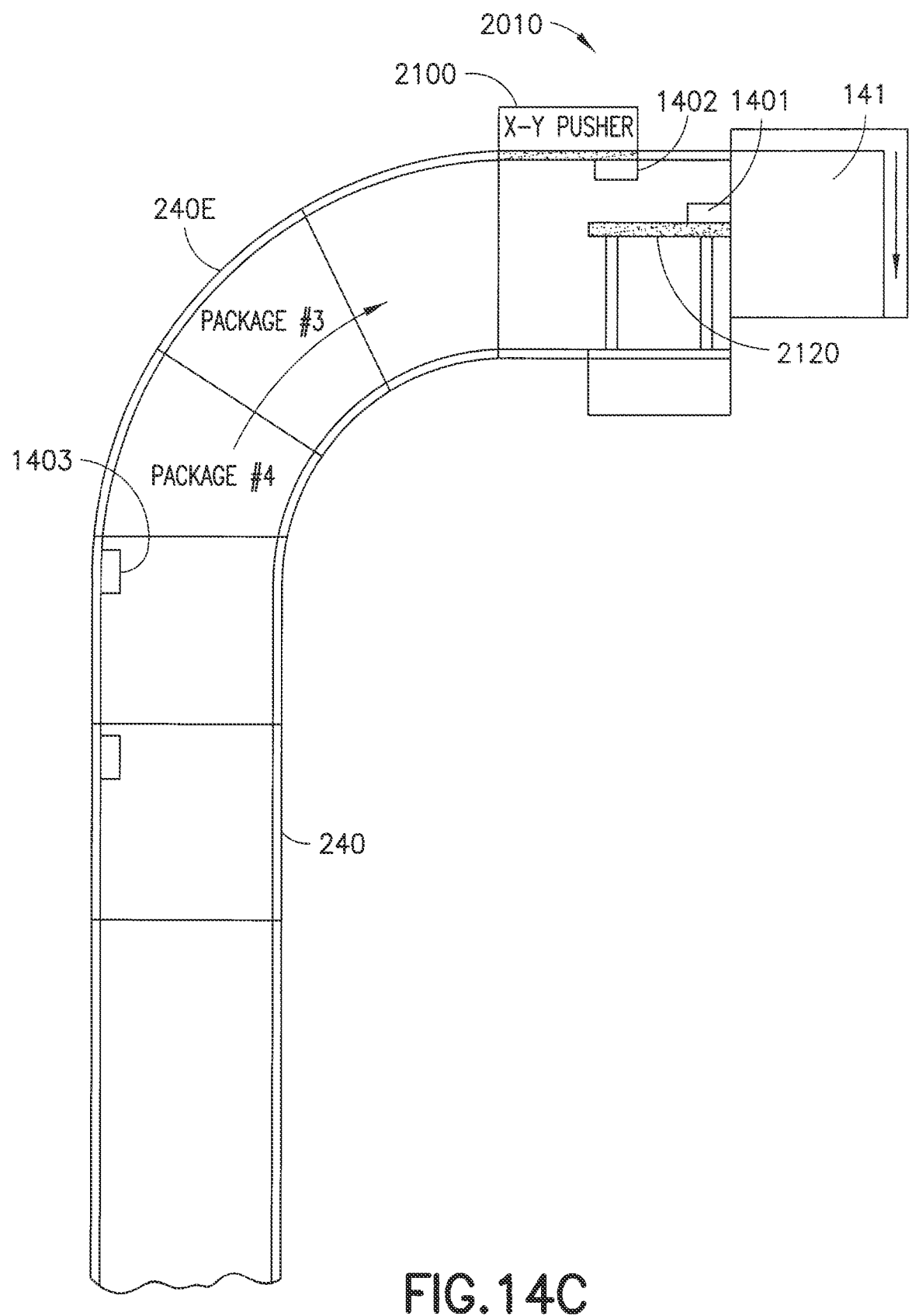

FIGS. 14A-14C illustrate another exemplary formation of a pickface but with smaller cases 1401-1402. In this example cases 1401-1403 are shown moving along the conveyor 240. The formation of the pickface of FIGS. 14A-14C occurs in substantially the same manner as that described above with respect to FIGS. 13A-13H. It is noted that all dimensions and time information shown in FIGS. 13A-14C are exemplary only and that any suitable dimensions and time values can be used.

Figure 16:
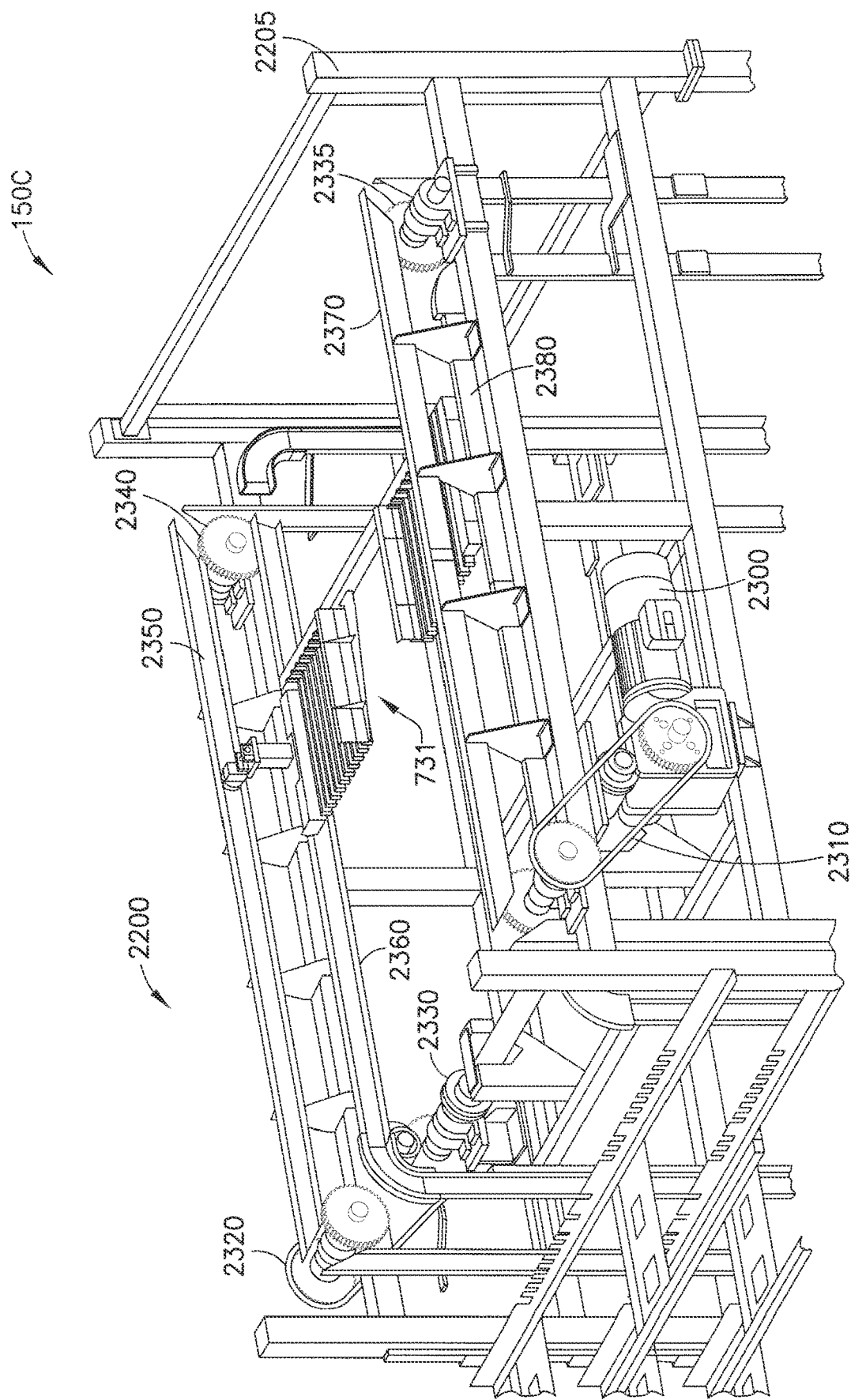
FIG. 16 illustrates platform guides in accordance with the embodiments.
Figure 17:
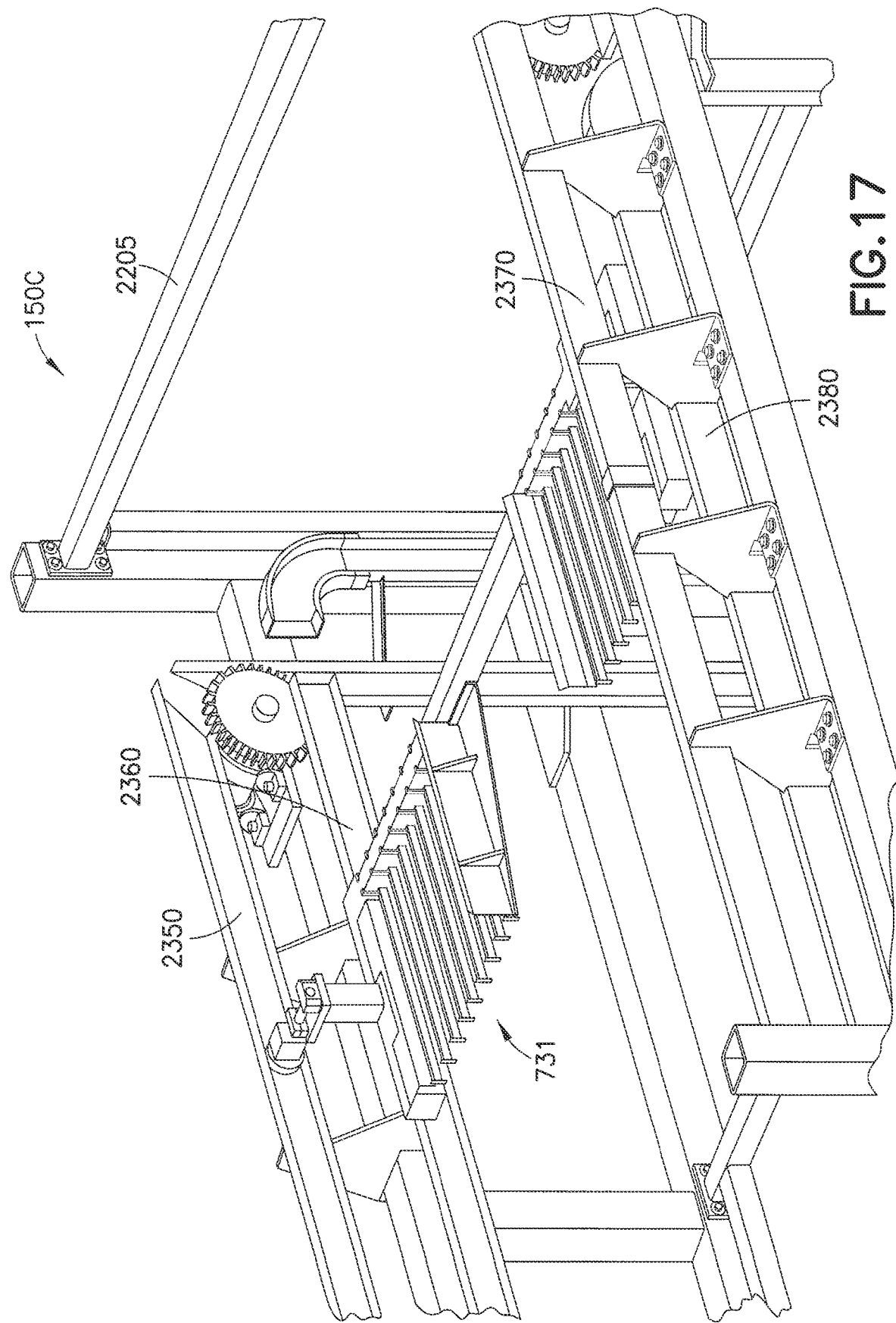
FIG. 17 illustrates platform guides in accordance with the embodiments.

Referring now to FIG. 15, there is shown an exemplary platform 731 of the MVC. In addition to the features described below, platform 731 may have similar features as described previously with respect to shelf or platform 730. Referring also to FIGS. 16 and 17, there is shown MVC 150C having platform guides 2200. In addition to the features described below, MVC 150C may have similar features as described with respect to MVC 150A or MVC 150B. In the embodiments platform 731 has guide wheels 2210, 2220, 2230 and 2240 mounted to frame 2250. In the embodiments, any suitable guide interface (e.g. single or multiple rollers, bearings), may be used in place of wheels. Chain couplers 2260 and 2270 are provided between rollers 2210, 2230 and frame 2250 respectively. Payload support surfaces 2280 and 2290 are provided coupled to frame 2250. Though the payload support surfaces or stations are shown, the platform may have more or fewer in the embodiments. MVC 150C has suitable motor drive 2300 which drives chain drives 2310 and 2320 (through shaft 2330 which in turn drive chain systems 2335 and 2340 respectively). Platform 731 may be coupled to chain systems 2335 and 2340 with couplings 2270 and 2260 respectively. Although guides 2200 are shown for the upper portion of MVC 150C, similar features may be provided on a lower portion of MVC 150C to provided continuous guidance of platform 731. Although a single platform 731 is shown on MVC 150C, multiple platforms may be provided at a common or multiple intervals. Guides 2200 are shown having generally four guide portions 2350, 2360, 2370 and 2380 corresponding to guide rollers 22210, 2220, 2230 and 2240 respectively and coupled to frame 2205 of MVC 150C. Guides 2350 and 2370 are provided offset at a wider stance with respect to guides 2360 and 2380. Guides 2350 and 2370 provide substantially continuous guidance of rollers 2210 and 2230 throughout the path of travel through MVC 150C and with breaks at the corners where sprockets in combination with chain couplings 2260 and 2270 provide continued guidance of platform 731 and where the breaks prevent an over constraint. Guides 2360 and 2380 provide substantially continuous guidance of rollers 2220 and 2240 throughout the path of travel through MVC 150C and with breaks where couplings 2260 and 2270 would interfere with guides 2360 and 2380 during passage and where guides 2360 and 2380 provide continued guidance of platform 731 and where the breaks prevent interference but also where guide wheel 2220 (see FIG. 15) is actively guided when guide wheel 2240 passes a break and where guide wheel 2240 is actively guided when guide wheel 2220 passes a break. As such, a substantially continuous three-point guidance is accomplished during the entire path of travel. In the embodiments, one or more of the motor 2300 chain drives 2310, 2320 and chain systems 2335, 2340 may include an active braking mechanism and velocity control. It is noted that the chain systems 2335, 2340 and the platforms generally revolve around the conveyor path at a substantially constant velocity to, for example, allow the bots to rendezvous with a platform. The braking mechanism and/or velocity control may substantially prevent the platforms from "free-wheeling" (e.g. moving without being driven by the motor 2300 and drive chains) if power is lost when a number of platforms are heavily loaded while others are substantially empty. Here, platform 731 travel may be guided by two sets of guide wheels 2210, 2220 and 2230, 2240 that travel within channels 2350, 2360 and 2370, 2380 on a predetermined path defined by the channels and drive system. Hence, the guide wheels 2210, 2220, 2230, 2240 and correspondingly the platform (and pickface(s) supported thereby) traveling along the path resist binding due to a balanced cantilevered arrangement and where transitions through corners are made by substantially continuously having three points (wheels) of contact within the roller guides 2350, 2360, 2370, 2380, providing smooth (substantially shudder/judder free) transition of platform 731 through the entire path of travel within MVC 150C. In the embodiments, one or more MVC(s) 150C enable loading and unloading of payloads, cases or pickfaces in storage racks of storage levels.

As noted before, MVC platforms 731 may have more than one pickface station, for example, for pickfaces of at least one case(s). Platforms 731 are cycled by chain drive 2335, 2340 and use guides 2200 such that the stations maintain stability capable of desired positioning of pickfaces through substantially the full motion cycle within MVC 150C and without over constraints that may cause shuddering, jamming or other unsuitable or undesired motions of the pickface(s) to occur. Here, the MVC platform connection to MVC drive system 2260, 2270, and MVC platform guides 2200 are configured to effect three (3) point contact between platform 731 and MVC structure through full motion cycle and without over constraints. The platform supports, formed by the guides 220 and drive system coupling 2260, 2270 form what may be referred to as a guided cantilever restraint that is movable through complete cycle without over-constraints, and, as a result without undesirable motion, such as shudder or judder through cycle motion. Accordingly a smooth and effective load and unload MVC cycle (e.g. infeed to off load for infeed MVC and vice versa for outfeed MVC) as well as MVC sorter (e.g. pickface payload moves through more than one cycle) may be provided. In the embodiments, MVC 150C has frame 2205, drive system 2300 and platforms 731 that are mounted to the frame and coupled to the drive system 2300 so the platforms 731 are cycled vertically in a closed loop. Platform(s) 731 may have one or more pickface payload holding stations (e.g. two 2280, 2290) that are located offset from each other, for example, positionally distributed on platform. In the embodiments, more or less locations may be provided. Each holding station may be configured for holding pickface of (one or more) uncontained cases(s). Each holding station may independently fed and offloaded. Independent feeds may have pickface builders that may be accommodated by MVC structure and motion path profile(s). Further, MVC 150C may be both a multilevel loader/unloader and sorter. In the embodiments, frame 2205 and drive 2300 may be configured to effect platform 731 motion that results in a vertical or horizontal cycle component in a same direction as load/unload transfer axis for a given pickface, for example, front-back. In the embodiments, the interface may be to warehouse conveyors, for example, a load station for infeed to MVC 150C or an unload station for outfeed from MVC 150C as may be located interior to frame 2205 and transport loop path of platforms 731 of MVC 150C. Interface with rack storage and retrieval system, for example, bot to MVC transfer locations may be provided on an outside of the transport loop path of platforms 731 of MVC 150C. In the embodiments, any suitable in feed or out feed may be provided on the inside, outside or otherwise of the transport path of platforms 731 of MVC 150C.

In a first aspect of the embodiments a pickface builder for a storage and retrieval system for storing goods units and having an in-feed conveyor and a picking device is provided. Each goods unit holds at least one product package therein. The pickface builder includes a frame, a pusher member movably coupled to the frame, and a snugger member movably coupled to the frame, wherein the pickface builder is configured to receive goods units from the in-feed conveyor and the pusher member and snugger member are movable at least in a direction transverse to a direction of goods unit travel on the in-feed conveyor and configured to form the goods units into a pickface picked by the picking device as a unit and having a predetermined reference datum relating the pickface to a placement position of goods units forming the pickface along a storage surface of the storage and retrieval system.

In accordance with a first sub-aspect of the first aspect of the embodiments the pusher member may be movable in at least two orthogonal directions for pushing the goods units towards the snugger member.

In accordance with the first sub-aspect of the first aspect of the embodiments, the snugger member is positioned to create the predetermined reference datum as the pusher member pushes goods units towards the snugger member.

In accordance with the first aspect of the embodiments, the pickface builder further includes a movable gate disposed adjacent the snugger member for retaining at least one goods unit as a pickface is formed from the at least one goods unit.

In accordance with a second sub-aspect of the first aspect of the embodiments, the pickface builder further includes a resolver member configured to obtain case goods unit as goods units are transferred to the pickface builder from the in-feed conveyor.

In accordance with the second sub-aspect of the first aspect of the embodiments, the pickface builder is configured to form pickfaces based on at least the goods unit data obtained from the resolver member.

In accordance with the second sub-aspect of the first aspect of the embodiments, the resolver member is configured to confirm an identity of the goods units being transferred to the pickface builder from the in-feed conveyor.

In accordance with the second sub-aspect of the first aspect of the embodiments, the pickface builder is configured to modify motion profiles of at least one of the pusher member and snugger member based on the goods unit data from the resolver member.

In accordance with the first aspect of the embodiments, the pickface builder further comprises a controller in communication with a controller of the picking device, the controller being configured to associate pickfaces with shelves of the picking device for tracking a position of the pickfaces on the picking device.

In accordance with a third sub-aspect of the first aspect of the embodiments, the pickface builder includes a controller configured to create motion profiles for the pusher member and snugger member based at least on predetermined goods unit data accessible by the controller.

In accordance with the third sub-aspect of the first aspect of the embodiments, wherein the controller includes a memory configured to store the predetermined goods unit data.

In accordance with the third sub-aspect of the first aspect of the embodiments the storage and retrieval system includes a system controller wherein the pickface builder is in direct or indirect communication with the system controller and the predetermined goods unit data is stored in a memory of the system controller.

In accordance with a fourth sub-aspect of the first aspect of the embodiments the pickface is formed from uncontained goods units.

In accordance with the fourth sub-aspect of the first aspect of the embodiments the pickface is a surface of the uncontained goods units forming the pickface.

In a second aspect of the aspect of the embodiments a storage and retrieval system is provided. The storage and retrieval system includes an in-feed conveyor, an in-feed station, a pickface builder disposed between the in-feed conveyor and in-feed station, and picking device connected to the in-feed station, the in-feed station being configured to transfer goods units to the picking device where each goods unit holds at least one product package therein. The pickface builder includes a frame, a pusher member movably coupled to the frame, and a snugger member movable coupled to the frame, wherein the pickface builder is configured to receive goods units from the in-feed conveyor and the pusher member and snugger member are movable at least in a direction transverse to a direction of goods unit travel on the in-feed conveyor and configured to form the goods units picked by the picking device as a unit into a pickface having a predetermined reference datum relating the pickface to a placement position of goods units forming the pickface along a storage surface of the storage and retrieval system.

In accordance with the second aspect of the embodiments, the pickface builder is located downstream of an elbow in the in-feed conveyor so that the pusher member and snugger member are substantially transverse to a direction of travel of the goods units from the in-feed station to the picking device.

In accordance with a first sub-aspect of the second aspect of the embodiments, the pickface builder further includes a controller configured to create motion profiles for the pusher member and snugger member based at least on predetermined goods unit data accessible by the controller.

In accordance with the first sub-aspect of the second aspect of the embodiments the controller includes a memory configured to store the predetermined goods unit data.

In accordance with the first sub-aspect of the second aspect of the embodiments the storage and retrieval system includes a system controller wherein the pickface builder is in direct or indirect communication with the system controller and the predetermined goods unit data is stored in a memory of the system controller.

In accordance with a third aspect of the embodiments, a pickface builder for a storage and retrieval system for storing goods unit and having an in-feed conveyor and a picking device is provided. Each goods unit holding at last one product package therein. The pickface builder includes a frame, a pusher member movably coupled to the frame, and a snugger member movably coupled to the frame, wherein the pickface builder is configured to receive goods units from the in-feed conveyor and the pusher member and snugger member are configured to form the goods units into a pickface picked by the picking device as a unit and having a predetermined reference datum where the predetermined reference datum depends on at least one predetermined pickface characteristic and relates the pickface to a placement position of goods units forming the pickface along a storage surface of the storage and retrieval system.

In accordance with a first sub-aspect of the third aspect of the embodiments the pickface builder further includes a controller configured to create motion profiles for the pusher member and snugger member based on the at least one predetermined pickface characteristic.

In accordance with the first sub-aspect of the third aspect of the embodiments the controller is in direct or indirect communication with a system controller of a storage and retrieval system and is configured to access the at least one predetermined pickface characteristic from a memory of the system controller.

It should be understood that the embodiments described herein may be used individually or in any suitable combination thereof. It should also be understood that the foregoing description is only illustrative of the embodiments. Various alternatives and modifications can be devised by those skilled in the art without departing from the embodiments. Accordingly, the embodiments are intended to embrace all such alternatives, modifications and variances within the scope of the appended claims.

What is claimed is:

1. A case pose orientating apparatus for a storage and retrieval system with an array of storage shelves for storing cases and having an in-feed conveyor and a picking device, each case holding at least one product package therein, the case pose orientating apparatus comprising:
   a frame;
   a pusher member movably coupled to the frame; and
   a snugger member movably coupled to the frame, wherein
      the case pose orientating apparatus is configured to
         receive a case from the in-feed conveyor, and the pusher member and snugger member are movable at least in a direction transverse to a direction of case travel on the in-feed conveyor, and the pusher member and the snugger member are configured to both orientate the case from a first pose, which first pose is substantially undetermined with respect to the direction of travel, to a second pose that is selectably controlled by the pusher member and snugger member with respect to the direction of travel, and substantially coincident with orientating the case, snug the case so as to form the case from a substantially unconstrained case shape into a substantially controlled case shape form picked by the picking device as a unit, where the substantially controlled case shape form is formed, by the pusher and snugger member, so as to define a structural positioning feature of the case picked by the picking device.

2. The case pose orientating apparatus of claim 1, wherein the substantially controlled case shape form is formed by the pusher and snugger member so as to have a predetermined reference datum that is formed by the substantially controlled case shape form of the case picked by the picking device.

3. The case pose orientating apparatus of claim 2, wherein the structural positioning feature defined by the predetermined reference datum relates a placement position of the case, picked by the picking device, placed along a storage surface from other placement positions of other cases, picked by the picking device, placed on the storage surface alongside the case.

4. The case pose orientating apparatus of claim 2, wherein the pusher member is movable in at least two orthogonal directions for pushing the cases towards the snugger member.

5. The case pose orientating apparatus of claim 4, wherein the snugger member is positioned to create the predetermined reference datum as the pusher member pushes cases towards the snugger member.

6. The case pose orientating apparatus of claim 1, wherein the case pose orientating apparatus further comprises a resolver member configured to obtain case data as cases are transferred to the case pose orientating apparatus from the in-feed conveyor.

7. The case pose orientating apparatus of claim 6, wherein the case pose orientating apparatus is configured to form pickfaces based on at least the case data obtained from the resolver member.

8. The case pose orientating apparatus of claim 6, wherein the resolver member is configured to confirm an identity of the cases being transferred to the case pose orientating apparatus from the in-feed conveyor.

9. The case pose orientating apparatus of claim 6, wherein the case pose orientating apparatus is configured to modify motion profiles of at least one of the pusher member and snugger member based on the case data from the resolver member.

10. The case pose orientating apparatus of claim 1, wherein the case pose orientating apparatus includes a controller configured to create motion profiles for the pusher member and snugger member based at least on predetermined case data accessible by the controller.

11. The case pose orientating apparatus of claim 10, wherein the controller includes a memory configured to store the predetermined case data.

12. The case pose orientating apparatus of claim 10, wherein the storage and retrieval system includes a system controller wherein the case pose orientating apparatus is in direct or indirect communication with the system controller and the predetermined case data is stored in a memory of the system controller.

13. A storage and retrieval system with an array of storage shelves comprising:
   an in-feed conveyor;
   an in-feed station;
   a case pose orienting apparatus disposed between the in-feed conveyor and in-feed station; and
   a picking device connected to the in-feed station, the in-feed station being configured to transfer cases to the picking device where each case holds at least one product package therein;
   wherein, the case pose orienting apparatus includes:
      a frame,
      a pusher member movably coupled to the frame, and
      a snugger member movably coupled to the frame,
         wherein the case pose orienting apparatus is configured to receive a case from the in-feed conveyor, and at least one of the pusher member and snugger member are movable at least in a direction transverse to a direction of case travel onto the case pose orienting apparatus from the in-feed conveyor, the pusher member and the snugger member are configured to both orientate the case from a first pose, which first pose is substantially undetermined with respect to the direction of travel, to a second pose that is selectably controlled by the pusher member and snugger member with respect to the direction of travel, and substantially coincident with orientating the case, snug the case so as to form the case from a substantially unconstrained case shape into a substantially controlled case shape form picked by the picking device as a unit, where the substantially controlled case shape form is formed, by the pusher and snugger member so as to define a structural positioning feature of the case picked by the picking device.

14. The storage and retrieval system of claim 13, wherein the substantially controlled case shape form is formed by the pusher and snugger member so as to have a predetermined reference datum that is formed by the substantially controlled case shape form of the case picked by the picking device.

15. The storage and retrieval system of claim 14, wherein the structural positioning feature defined by the predetermined reference datum relates a placement position of the case, picked by the picking device, placed along a storage surface from other placement positions of other cases, picked by the picking device, placed on the storage surface alongside the case.

16. The storage and retrieval system of claim 13, wherein the case pose orienting apparatus further includes a controller configured to create motion profiles for the pusher member and snugger member based at least on predetermined case data accessible by the controller.

17. The storage and retrieval system of claim 16, wherein the controller includes a memory configured to store the predetermined case data.

18. The storage and retrieval system of claim 17, wherein the storage and retrieval system includes a system controller wherein the case pose orienting apparatus is in direct or indirect communication with the system controller and the predetermined case data is stored in a memory of the system controller.

* * * * *